US010518214B2

(12) United States Patent
Riley

(10) Patent No.: US 10,518,214 B2
(45) Date of Patent: Dec. 31, 2019

(54) PORTABLE CARBON DIOXIDE ABSORPTION SYSTEM

(71) Applicant: ALLIED HEALTHCARE PRODUCTS, INC., St. Louis, MO (US)

(72) Inventor: Andrew D. Riley, St. Louis, MO (US)

(73) Assignee: Allied Healthcare Products, Inc., St. Louis, MO (US)

(*) Notice: Subject to any disclaimer, the term of this patent is extended or adjusted under 35 U.S.C. 154(b) by 0 days.

(21) Appl. No.: 15/889,358

(22) Filed: Feb. 6, 2018

(65) Prior Publication Data
US 2018/0369750 A1 Dec. 27, 2018

Related U.S. Application Data

(60) Provisional application No. 62/523,658, filed on Jun. 22, 2017.

(51) Int. Cl.
*B01D 53/02* (2006.01)
*B01D 53/62* (2006.01)
*B01D 53/81* (2006.01)
*B01D 53/78* (2006.01)
*B01D 53/14* (2006.01)
*B01D 53/34* (2006.01)
*B01D 53/18* (2006.01)
*B01D 53/04* (2006.01)
*B01D 53/30* (2006.01)
*B01D 53/82* (2006.01)

(52) U.S. Cl.
CPC ......... *B01D 53/62* (2013.01); *B01D 53/0415* (2013.01); *B01D 53/0454* (2013.01); *B01D 53/1412* (2013.01); *B01D 53/1475* (2013.01); *B01D 53/1493* (2013.01); *B01D 53/185* (2013.01); *B01D 53/30* (2013.01); *B01D 53/346* (2013.01); *B01D 53/78* (2013.01); *B01D 53/81* (2013.01); *B01D 53/82* (2013.01); *B01D 2252/20405* (2013.01); *B01D 2252/20421* (2013.01); *B01D 2252/20484* (2013.01); *B01D 2253/1124* (2013.01); *B01D 2257/504* (2013.01); *B01D 2258/06* (2013.01); *B01D 2259/4508* (2013.01); *B01D 2259/4541* (2013.01); *B01D 2259/4575* (2013.01)

(58) Field of Classification Search
CPC ........... B01D 2252/20405; B01D 2252/20421; B01D 2252/20484; B01D 2257/504; B01D 2258/06; B01D 53/1412; B01D 53/1475; B01D 53/1493; B01D 53/185; B01D 53/346; B01D 53/62; B01D 53/78; B01D 53/81
See application file for complete search history.

(56) References Cited

U.S. PATENT DOCUMENTS 3,178,269 A 4/1965 McConnaughey
3,469,934 A 9/1969 Bocard
(Continued)

OTHER PUBLICATIONS

International Search Report and Written Opinion issued in corresponding PCT Application No. PCT/US2018/016966 dated Jun. 11, 2018, 12 pages.

*Primary Examiner* — Christopher P Jones
(74) *Attorney, Agent, or Firm* — Polsinelli PC

(57) ABSTRACT

Various embodiments of a portable carbon dioxide (CO2) absorption device that may remove excess CO2 from a closed environment are disclosed herein. The absorption device is reusable and configured for many environments.

18 Claims, 30 Drawing Sheets

(56) References Cited

U.S. PATENT DOCUMENTS

| | | |
|---|---|---|
| 5,186,903 A | 2/1993 | Cornwell |
| 5,595,949 A | 1/1997 | Goldstein |
| 2003/0209140 A1 | 11/2003 | Kutt |
| 2008/0216653 A1 | 9/2008 | Paton-Ash |
| 2011/0318231 A1 | 12/2011 | Hago |

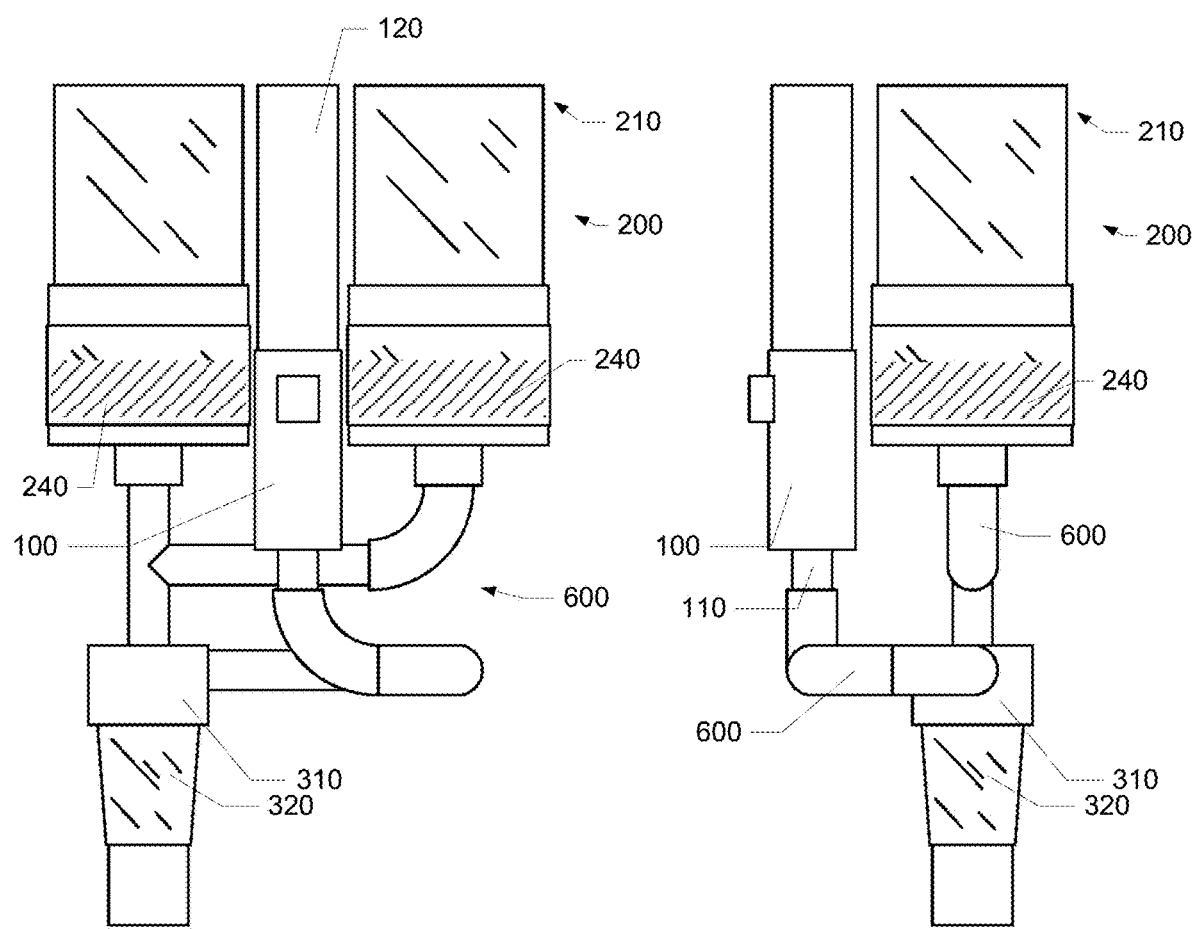

| Time | % CO$_2$ Alpha 1 Level | % CO$_2$ with Machine Off - Part 1 | Drager Pac 7000 Readings Part 2 | Time | % CO$_2$ Alpha 1 Level | % CO$_2$ with Machine Off - Part 1 | Drager Pac 7000 Readings Part 2 |
|---|---|---|---|---|---|---|---|
| | | | | 12:14 PM | 0.5 | 3.884 | 0.0 |
| | | | | 12:15 PM | 0.5 | 3.885 | 0.0 |
| 11:29 AM | 0.5 | 0.067 | 0.0 | 12:16 PM | 0.5 | 3.827 | 0.0 |
| 11:30 AM | 0.5 | 0.088 | 0.0 | 12:17 PM | 0.5 | 3.901 | 0.0 |
| 11:31 AM | 0.5 | 0.338 | 0.0 | 12:18 PM | 0.5 | 3.893 | 0.0 |
| 11:32 AM | 0.5 | 0.333 | 0.0 | 12:19 PM | 0.5 | 3.860 | 0.0 |
| 11:33 AM | 0.5 | 0.356 | 0.0 | 12:20 PM | 0.5 | 3.878 | 0.0 |
| 11:34 AM | 0.5 | 0.373 | 0.0 | 12:21 PM | 0.5 | 3.880 | 0.0 |
| 11:35 AM | 0.5 | 0.400 | 0.0 | 12:22 PM | 0.5 | 3.959 | 0.0 |
| 11:36 AM | 0.5 | 0.458 | 0.0 | 12:23 PM | 0.5 | 3.992 | 0.0 |
| 11:37 AM | 0.5 | 0.493 | 0.0 | 12:24 PM | 0.5 | 4.117 | 0.0 |
| 11:38 AM | 0.5 | 0.530 | 0.0 | 12:25 PM | 0.5 | 4.012 | 0.0 |
| 11:39 AM | 0.5 | 0.660 | 0.0 | 12:26 PM | 0.5 | 4.086 | 0.0 |
| 11:40 AM | 0.5 | 0.733 | 0.0 | 12:27 PM | 0.5 | 4.209 | 0.0 |
| 11:41 AM | 0.5 | 0.816 | 0.0 | 12:28 PM | 0.5 | 4.332 | 0.0 |
| 11:42 AM | 0.5 | 1.026 | 0.0 | 12:29 PM | 0.5 | 4.402 | 0.0 |
| 11:43 AM | 0.5 | 1.054 | 0.0 | 12:30 PM | 0.5 | 4.364 | 0.0 |
| 11:44 AM | 0.5 | 1.119 | 0.0 | 12:31 PM | 0.5 | 4.409 | 0.0 |
| 11:45 AM | 0.5 | 1.210 | 0.0 | 12:32 PM | 0.5 | 4.493 | 0.0 |
| 11:46 AM | 0.5 | 1.326 | 0.0 | 12:33 PM | 0.5 | 4.624 | 0.0 |
| 11:47 AM | 0.5 | 1.466 | 0.0 | 12:34 PM | 0.5 | 4.697 | 0.0 |
| 11:48 AM | 0.5 | 1.513 | 0.0 | 12:35 PM | 0.5 | 4.677 | 0.0 |
| 11:49 AM | 0.5 | 1.686 | 0.0 | 12:36 PM | 0.5 | 4.711 | 0.0 |
| 11:50 AM | 0.5 | 1.770 | 0.0 | 12:37 PM | 0.5 | 4.788 | 0.0 |
| 11:51 AM | 0.5 | 1.960 | 0.0 | 12:38 PM | 0.5 | 4.869 | 0.0 |
| 11:52 AM | 0.5 | 2.033 | 0.0 | 12:39 PM | 0.5 | 4.896 | 0.0 |
| 11:53 AM | 0.5 | 2.126 | 0.0 | 12:40 PM | 0.5 | 4.944 | 0.0 |
| 11:54 AM | 0.5 | 2.325 | 0.0 | 12:41 PM | 0.5 | 5.009 | 0.0 |
| 11:55 AM | 0.5 | 2.428 | 0.0 | 12:42 PM | 0.5 | 4.971 | 0.4 |
| 11:56 AM | 0.5 | 2.436 | 0.0 | 12:43 PM | 0.5 | 4.975 | 0.4 |
| 11:57 AM | 0.5 | 2.540 | 0.0 | 12:44 PM | 0.5 | 4.959 | 0.4 |
| 11:58 AM | 0.5 | 2.581 | 0.0 | 12:45 PM | 0.5 | 4.968 | 0.5 |
| 11:59 AM | 0.5 | 2.678 | 0.0 | 12:46 PM | 0.5 | 4.964 | 0.5 |
| 12:00 PM | 0.5 | 2.898 | 0.0 | 12:47 PM | 0.5 | 4.908 | 0.5 |
| 12:01 PM | 0.5 | 2.963 | 0.0 | 12:48 PM | 0.5 | 4.894 | 0.6 |
| 12:02 PM | 0.5 | 3.030 | 0.0 | 12:49 PM | 0.5 | 4.869 | 0.6 |
| 12:03 PM | 0.5 | 3.091 | 0.0 | 12:50 PM | 0.5 | 4.851 | 0.6 |
| 12:04 PM | 0.5 | 3.151 | 0.0 | 12:51 PM | 0.5 | 4.854 | 0.6 |
| 12:05 PM | 0.5 | 3.199 | 0.0 | 12:52 PM | 0.5 | 4.826 | 0.7 |
| 12:06 PM | 0.5 | 3.353 | 0.0 | 12:53 PM | 0.5 | 4.801 | 0.7 |
| 12:07 PM | 0.5 | 3.395 | 0.0 | 12:54 PM | 0.5 | 4.787 | 0.7 |
| 12:08 PM | 0.5 | 3.473 | 0.0 | 12:55 PM | 0.5 | 4.782 | 0.8 |
| 12:09 PM | 0.5 | 3.535 | 0.0 | 12:56 PM | 0.5 | 4.774 | 0.8 |
| 12:10 PM | 0.5 | 3.616 | 0.0 | 12:57 PM | 0.5 | 4.794 | 0.9 |
| 12:11 PM | 0.5 | 3.741 | 0.0 | 12:58 PM | 0.5 | 4.794 | 0.9 |
| 12:12 PM | 0.5 | 3.823 | 0.0 | | | | |
| 12:13 PM | 0.5 | 3.860 | 0.0 | | | | |

FIG. 33

PORTABLE CARBON DIOXIDE ABSORPTION SYSTEM

CROSS REFERENCE TO RELATED APPLICATIONS

This is a non-provisional application that claims benefit to U.S. provisional application Ser. No. 62/523,658 filed on Jun. 22, 2017, which is herein incorporated by reference in its entirety.

FIELD

The present disclosure generally relates to a portable carbon dioxide ($CO_2$) absorption device that may remove excess $CO_2$ from a closed environment. The absorption device is reusable and configured for many environments.

BACKGROUND

Use of frozen carbon dioxide ($CO_2$), commonly called dry ice, to maintain low temperatures during the transport of perishable items, is a common practice in many industries. However, during transit and periods of loading and or unloading, the dry ice may sublimate to $CO_2$ gas. In many environments, such as sealed or poorly ventilated areas of an airplane, truck, or shipping container, increased $CO_2$ concentrations may have detrimental consequences. Present technology is not portable; it is large, heavy, cumbersome, and arduous to set up and requires a large footprint or committed space for use. The present technology cannot be brought to the problem or area where carbon dioxide ($CO_2$) gas levels are increasing, but this invention can be brought to the problem where carbon dioxide ($CO_2$) gas levels are increasing and scrub out the dangerous $CO_2$ gas levels to reasonable permissible levels. The present technology requires large canisters or cartridges that are heavy and difficult to change.

This invention will keep aircrews safe from toxic levels of carbon dioxide gas produced from the sublimation of dry ice required for perishable shipments during engine starts and de-icing events. This is especially dangerous in confined/small/limited/enclosed spaces such as the cockpit and supernumerary of a plane where the flight crew resides. Once the exposure to $CO_2$ in the cockpit and or supernumerary exceeds 0.5% $CO_2$ by volume (v/v), the aircrew, per policy and safety procedure, has to don oxygen masks, and bring the plane back to the gate where the aircrew leaves the plane, the plane is ventilated, and shipments are delayed. In addition, this invention will increase the air transport dry ice capacity and reduce the number of delayed shipments due to increased carbon dioxide gas levels in aircrew occupied areas, i.e., cockpit and supernumerary.

SUMMARY

The disclosure generally relates to a portable device that reduces the level of carbon dioxide in an environment. In various embodiments, the device operates automatically to continuously monitor and reduce the concentration of carbon dioxide in an environment. The device may be battery operated or powered by an external power supply. The device is durable and suitable for many industrial applications.

BRIEF DESCRIPTION OF FIGURES

The application file contains at least one photograph executed in color. Copies of this patent application publication with color photographs will be provided by the Office upon request and payment of the necessary fee.

FIGS. 9-14 are various views of an internal component assembly of a portable carbon dioxide absorption system according to various embodiments.

FIG. 33 is a table showing $CO_2$ absorption levels over time with the portable carbon dioxide absorption system operating in various states, of according to one embodiment.

Figure 1:
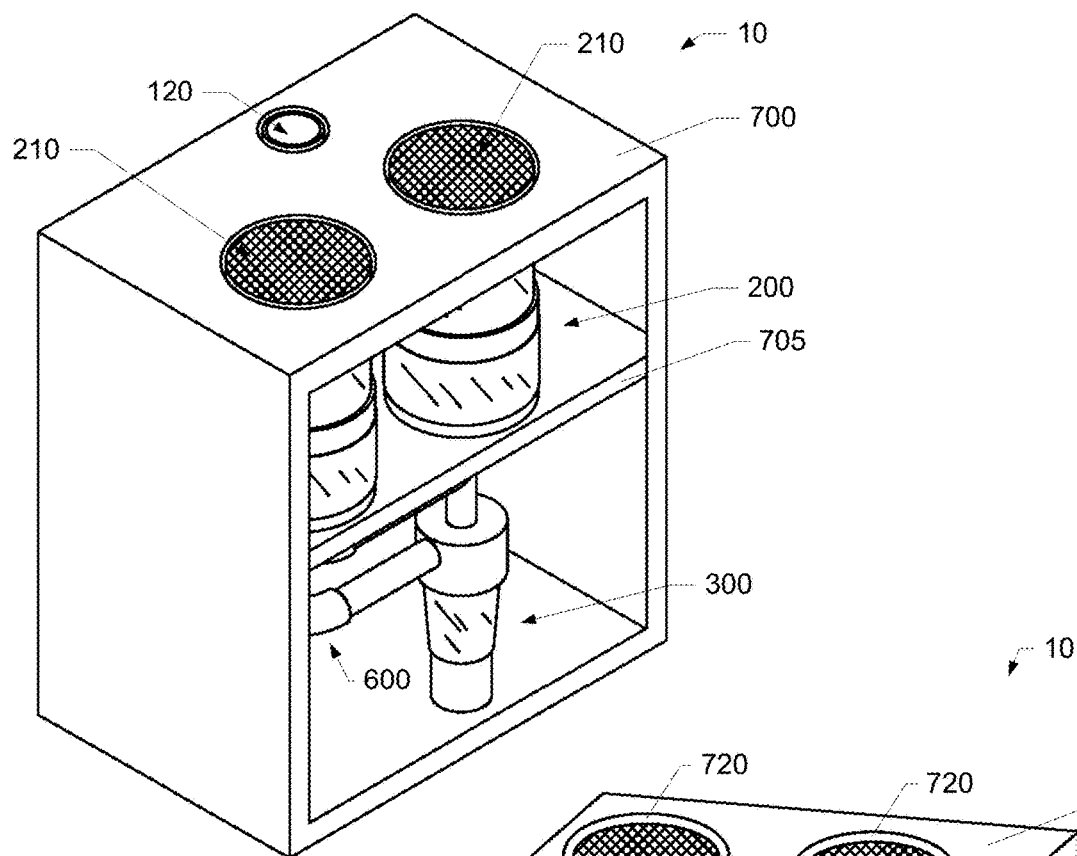
FIG. 1 is a front perspective view of a portable carbon dioxide absorption system with portions of the exterior housing removed according to one embodiment.

Any dimensions in the figures are merely for example and do not necessarily limit the size of the devices depicted.

DETAILED DESCRIPTION

The present disclosure relates to a lightweight and portable carbon dioxide absorbing system for removing or scrubbing carbon dioxide gas from the air. The system may be configured for a wide variety of environments. For example, the carbon dioxide absorbing system may maintain or reduce $CO_2$ levels in airplanes before, during, and after flight.

The United States Federal Aviation Administration (FAA) classifies dry ice as a hazardous material. The FAA has published guidelines for determining dry ice capacities in aircraft. Per the FAA Advisory Circular, 91-76A, Hazard Associated with Sublimation of Solid Carbon Dioxide (dry Ice) Aboard Aircraft, the exposure to $CO_2$ in the aircraft should not exceed 0.5% $CO_2$ by volume (v/v). Sublimed $CO_2$ is colorless and odorless and at high concentrations in a confined/small/limited/enclosed space, such as an airplane, can cause aircrew incapacitation.

Gaseous $CO_2$ produced from the sublimation of dry ice or produced from other sources is also regulated. The FAA notes that sublimed solid $CO_2$ produces excess $CO_2$ gas and this may be dangerous in confined spaces where there is no ventilation or ventilation rates are low. This condition is exacerbated during airplane engine starts and de-icing of the airplane where the power packs or electrical infrastructure is shut down and all ventilation and air exchange is stopped.

The sublimation rate depends on environmental conditions such as temperature and pressure, the physical properties of the dry ice such as surface area, and the quality of the packaging such as insulated versus non-insulated materials. The FAA has developed a standard formula to provide a rule of thumb for dry ice loading; the product of the desired $CO_2$ concentration, 0.5% v/v, the total volume of the aircraft and the complete number of air exchanges per hour proportional to two standard sublimation rates: 1% per hour and 2% per hour. Therefore, for a sublimation rate, when the number of air exchanges is doubled, then the permissible capacity for transported volumes of dry ice also doubles. Conversely, if the air exchanges are reduced relative to a determined sublimation rate, then the permissible capacity of dry ice that can be transported is also reduced by half.

In various aspects, modern aircraft may recycle as much as 50% of cabin-ventilated air, instead of providing 100% fresh air exchange. This reduction in volume of complete air exchanges per hour therefore leads to a reduction in permissible dry ice shipping capacities. As a reduced dry ice capacity would affect the volume and timeline for the transport of perishable items, food, medicine, and/or biological materials, a means to maintain safe $CO_2$ levels is needed.

The Portable Carbon Dioxide Absorption Machine (PCDAM) of the present disclosure is well suited to reduce or maintain $CO_2$ levels in confined environments. As $CO_2$ gas is denser than air, the $CO_2$ gas displaces air and remains low to the floor or ground. The PCDAM can be conveniently and easily placed in the cockpit and supernumerary and operated even when the plane is powered down, without the airplane's power packs or network, to maintain safe $CO_2$ concentration levels. The PCDAM can be turned on during de-icing and engine starting events where it will maintain a safe environment for the aircrew, reduce the number of delayed shipments, and increase the overall air transport dry ice capacity where employed.

The PCDAM may also be scaled up or down or reconfigured to fit a variety of spaces and environments. For example, besides freighter or cargo airplanes, the PCDAM may also be used in food processing environments, where carbon dioxide is a food additive, a propellant, acidity regulator, leavening agent, or used to remove caffeine. Similarly, the PCDAM may be used in beverage manufacturing facilities and breweries where $CO_2$ is used to carbonate soft drinks, aid in fermentation, and to rapidly cool grapes to prevent spontaneous fermentation prior to processing. The PCDAM is also suitable for many other industrial applications. These include, but are not limited to, facilities where welding, metal working and construction are performed, as $CO_2$ gas is a shielding gas for welding or a pressurized propellant for portable pneumatic tools. These industrial applications also include any facility with a fire suppression system, as these typically include large amounts of liquid and gas carbon dioxide at various pressures. After a fire, it is desirable to remove the dense carbon dioxide gas to aid in rescue and recovery. The PCDAM may also be used in a biological facilities, slaughterhouses, and laboratories where high rates of photosynthesis or bacterial and waste decomposition generate volumes of $CO_2$.

In commercial refrigeration applications, a carbon dioxide based refrigerant may be used, while in oil extraction operations, carbon dioxide gas may be injected into wells at high pressures. Both applications involve large volumes of $CO_2$ that may adversely affect operators if a leak or other accident occurs. Similarly, large volumes of $CO_2$ are used or produced in cement production, foundries, and power plants, all of which benefit from controlling levels of $CO_2$ in the local environment.

In general, the PCDAM has a small portable configuration. By way of example and not limitation, the PCDAM may be lightweight (approximately less than 18 kg or 40 lb.) and compact (approximately the size of a carry-on suitcase). In one example, the PCDAM 10 may be approximately 14 inches wide×9 inches deep×24 inches tall.

In various embodiments, The Portable Carbon Dioxide Absorption Machine (PCDAM) 10, as shown in FIGS. 1-8, includes one or more blower/fans 100, one or more $CO_2$ absorbing devices 200, a manifold 300, a power system 400, a control system 500, a fluid conduit arrangement 600, and a housing 700. Embodiments of the one or more blower/fans 100, the one or more $CO_2$ absorbing devices 200, the manifold 300, and the fluid conduit arrangement 600 as assembled are shown without the housing in FIGS. 9-14.

The blower/fan 100 is an air-moving device capable of flow rates in the range of 20-60 cubic feet per minute, according to one embodiment. The blower includes an inlet that is in fluid communication with the $CO_2$ devices 200 and the manifold 300 via the fluid conduit system 600. According to one embodiment, when in operation, the blower/fan 100 generates a positive pressure to push air, generally indicated by air flow 800 in FIG. 2, through the manifold 300 and out through the $CO_2$ devices 200. Alternately, in other embodiments, the blower/fan 100 generates a negative pressure to draw air, indicated by airflow 900, in through the $CO_2$ devices 200, through the manifold 300, and out of the housing 700.

During operation, the air in the local environment is recycled at approximately 20-50 cubic feet per minute. The PCDAM 10 may reduce the level of $CO_2$ by 0.05-0.15% (v/v) per minute or to acceptable levels. In other embodiments, the PCDAM device operates at a maximum flow rate for maximum $CO_2$ absorption. Alternatively, the PCDAM may operate to provide a gradual or metered reduction in $CO_2$ concentration. In this embodiment, the PCDAM may continuously monitor the environment and maintain a specific $CO_2$ concentration by varying the flow rate of air through the absorbing devices. By way of example, the flow rate may be varied via a potentiometer or similar component.

In various embodiments, the blower/fan 100 has a blower configuration wherein air is counter-currently pushed by a blower/fan by a wheel (not shown) driven by a fully enclosed brushless motor that is suitable for dirty, dusty and/or damp environments. In various other embodiments, the blower/fan 100 has a fan configuration wherein a propeller pushes air out of the blower/fan.

Figure 5:
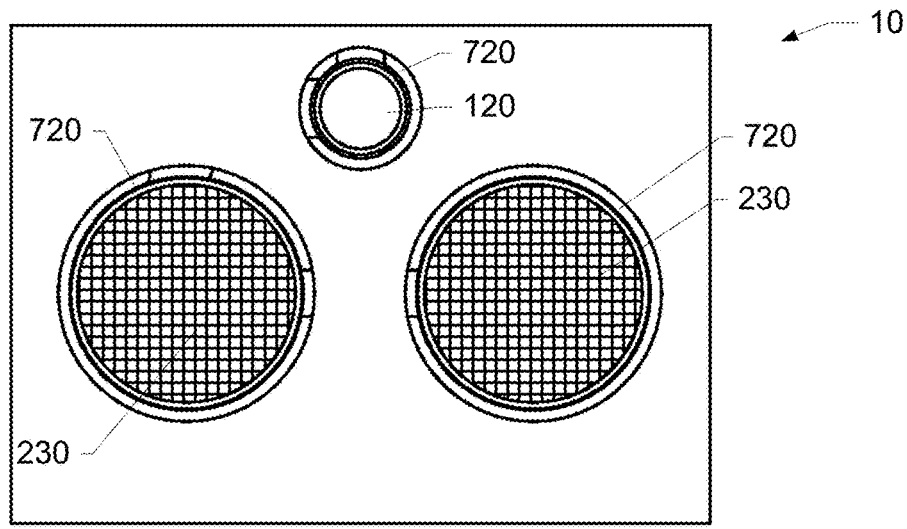
FIG. 5 is a top plan view of a portable carbon dioxide absorption system according to one embodiment.
Figure 22:
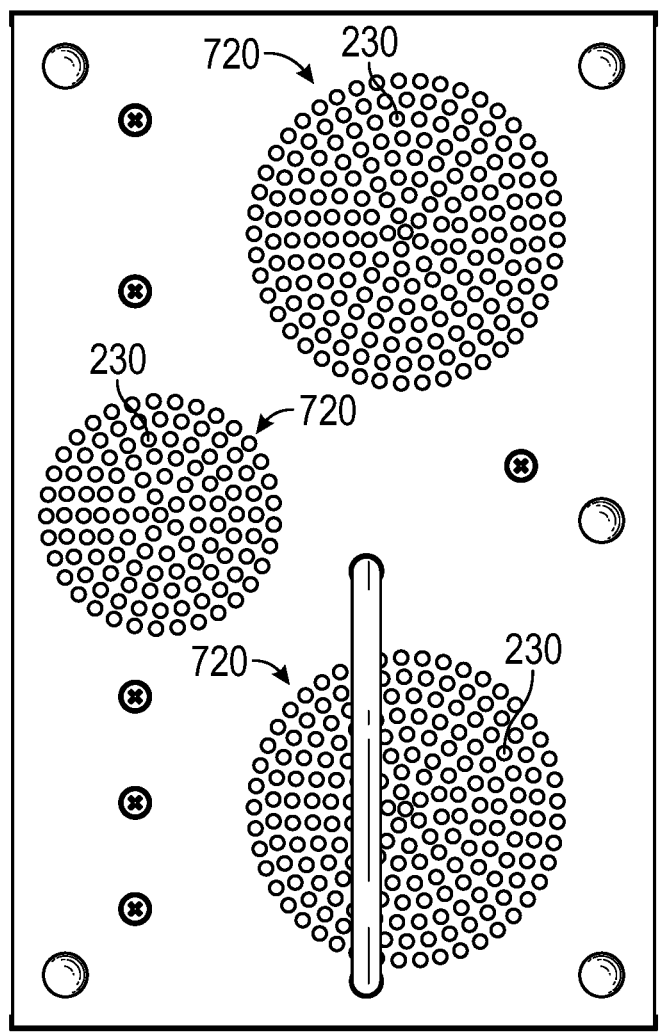

In operation, the PCDAM reduced $CO_2$ levels using a variety of means. In one embodiment, the PCDAM 10 includes one or more $CO_2$ absorbing devices 200 configured to permit air to drawn in through an inlet portion 120 and an outlet portion 210. The outlet portion 210 generally has a width greater than that of the inlet portion 120 to decrease the velocity of air leaving the absorbing device 200; this ensures laminar flow, consistent rates of reaction and low buoyancy to prevent the release of dust, dirt, or particulates to the surrounding environment. In various embodiments, the outlet portion 210 includes a screen, mesh, or multiple openings 230, as shown in FIG. 5 and FIG. 22, to permit the release of air, while preventing undesired objects from entering or leaving the devices. The outlet portion 210 may be positioned generally opposite the inlet 120 and contain a $CO_2$ absorbing material in such a configuration to maximize airflow therethrough.

For example, the $CO_2$ absorbing device 200 may incorporate a solid $CO_2$ absorbing material 240. For example, the $CO_2$ absorbent 240 may include one or more derivatives of ammonia (i.e., an amine such as monoethanolamine, among others). In other embodiments, the $CO_2$ absorbent 240 may be composed of one or more minerals. The mineral or minerals are typically provided in powder form, while in other embodiments, forms of the mineral material may be provided. These include, but are not limited to solid, semi-solid, or liquid compositions. Typically, the minerals are chemically configured as oxides, so the $CO_2$ reacts with the minerals to form carbonate. Preferably, the absorbent material 240 is suitable for disposal with general waste and not subject to hazardous waste procedures.

One advantage of the PCDAM 10 is the interchangeability of the $CO_2$ absorbing devices 200. After a period of operation, each $CO_2$ absorbing device 200 may be removed and replaced to provide continual reduction of $CO_2$ levels in the environment. In one embodiment, The $CO_2$ absorbent devices house the absorbent 240 in convenient canister cartridges for practical and quick replacement of the media. In other embodiments, the absorbing device 200 may use refillable canisters.

Figure 6:
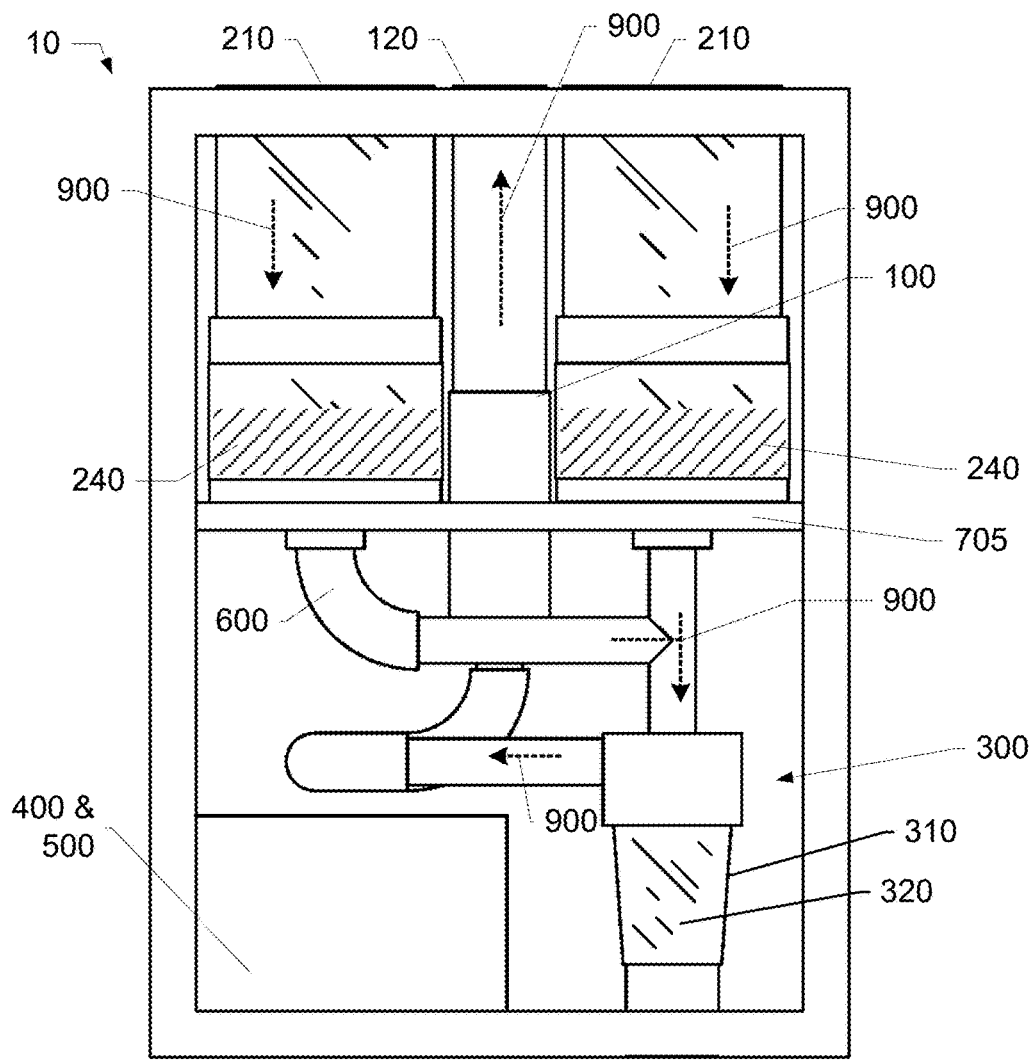
FIG. 6 is a front elevation view of a portable carbon dioxide absorption system with portions of the exterior housing removed according to one embodiment.
Figure 7:
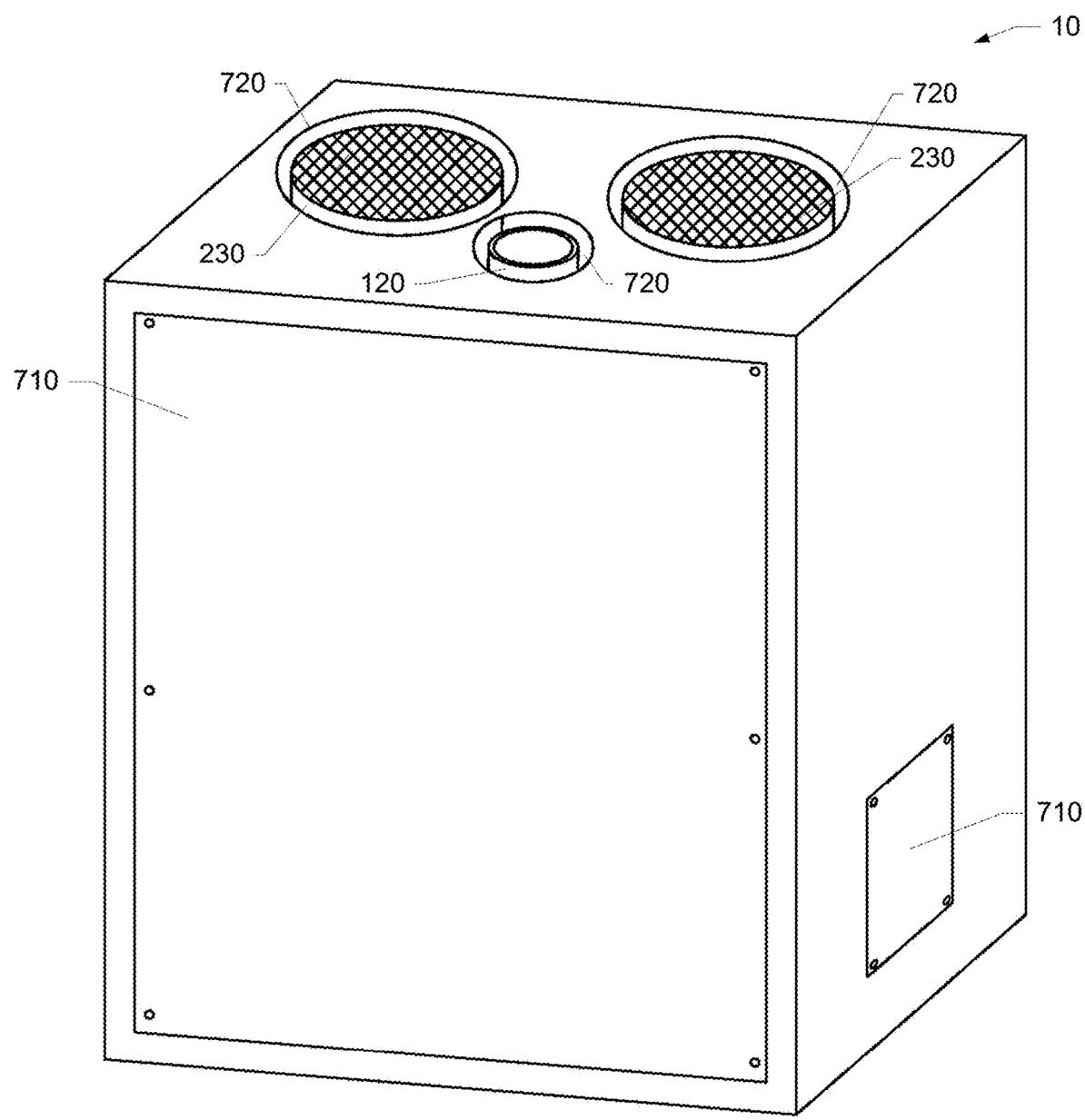
FIG. 7 is a front perspective view of a portable carbon dioxide absorption system with the exterior housing in place according to one embodiment.
Figure 8:
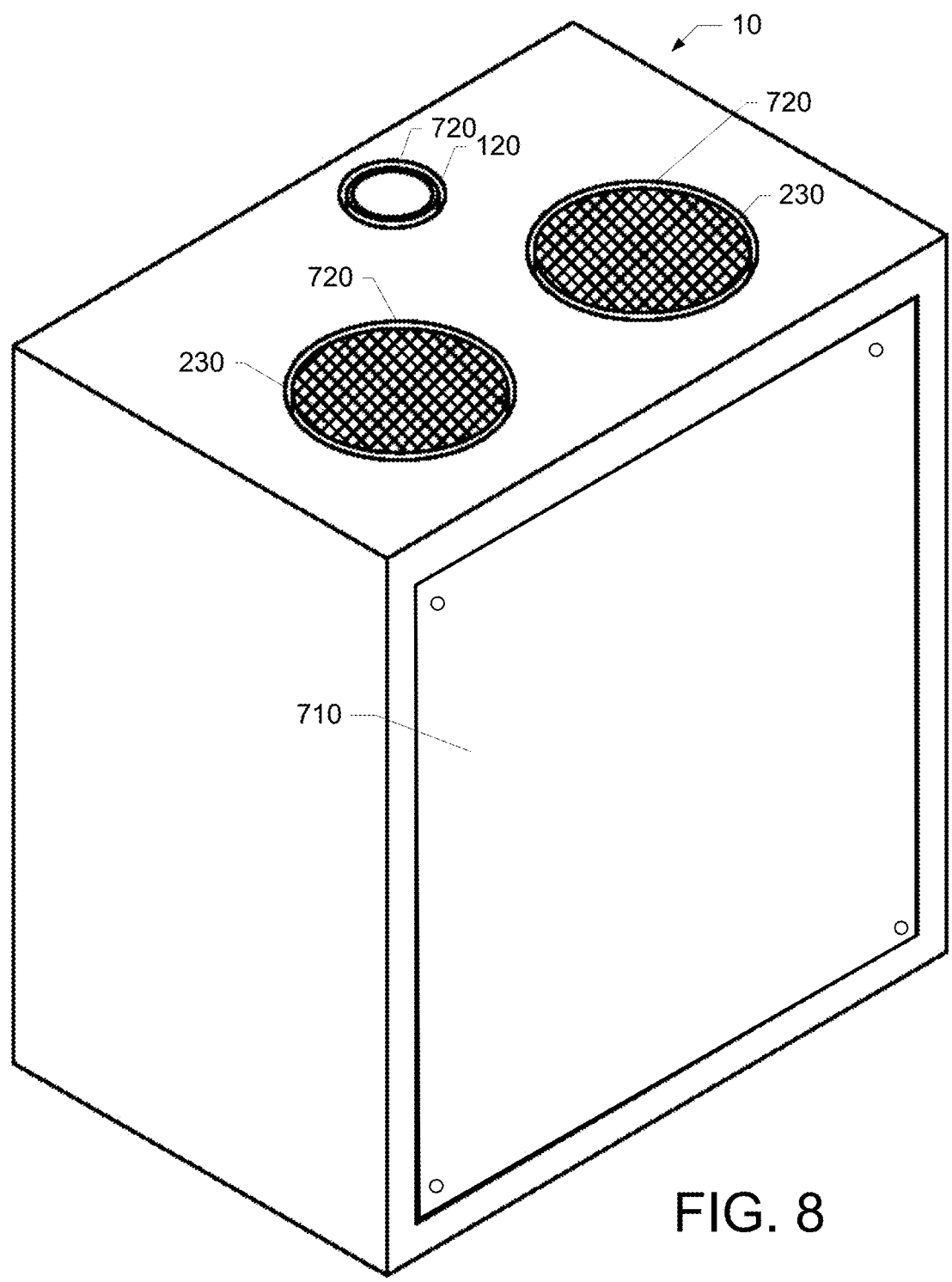
FIG. 8 is a front perspective view of a portable carbon dioxide absorption system with the exterior housing in place according to one embodiment.
Figure 9:
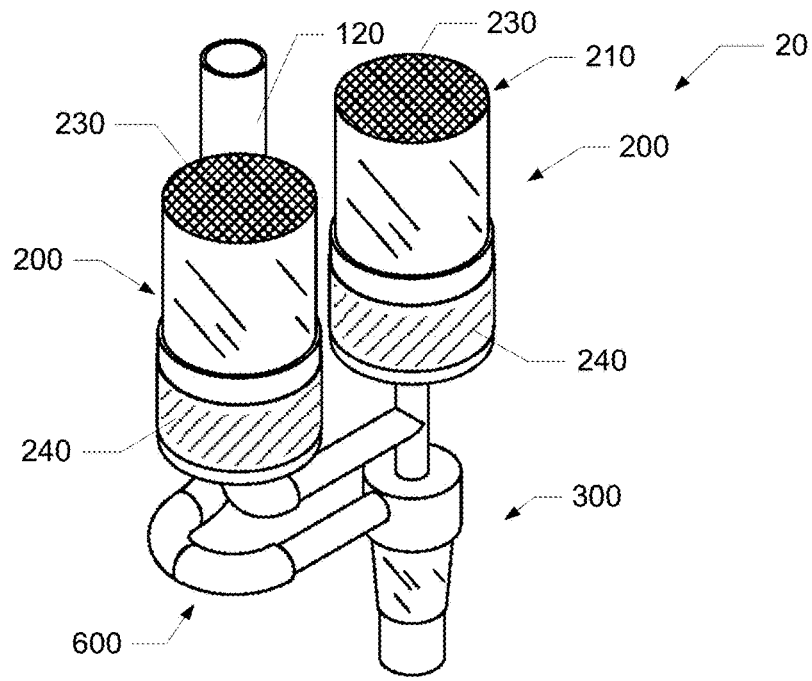
Figure 10:
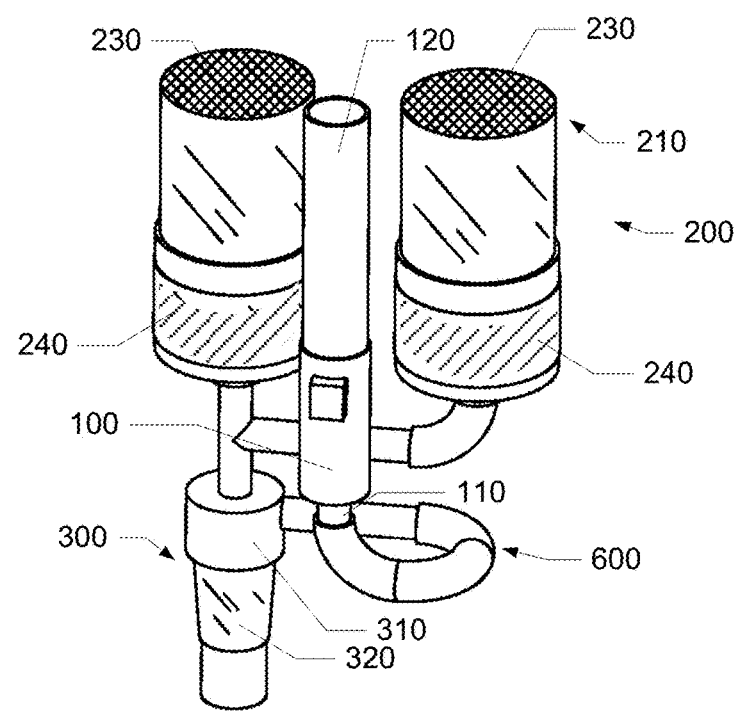
Figure 13:
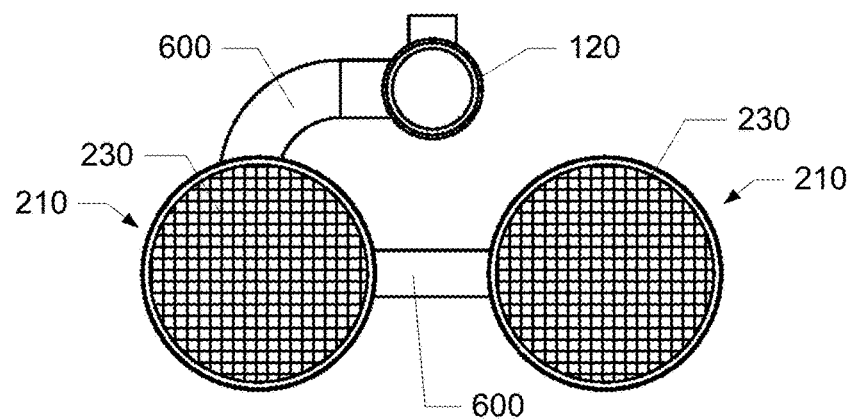
Figure 14:
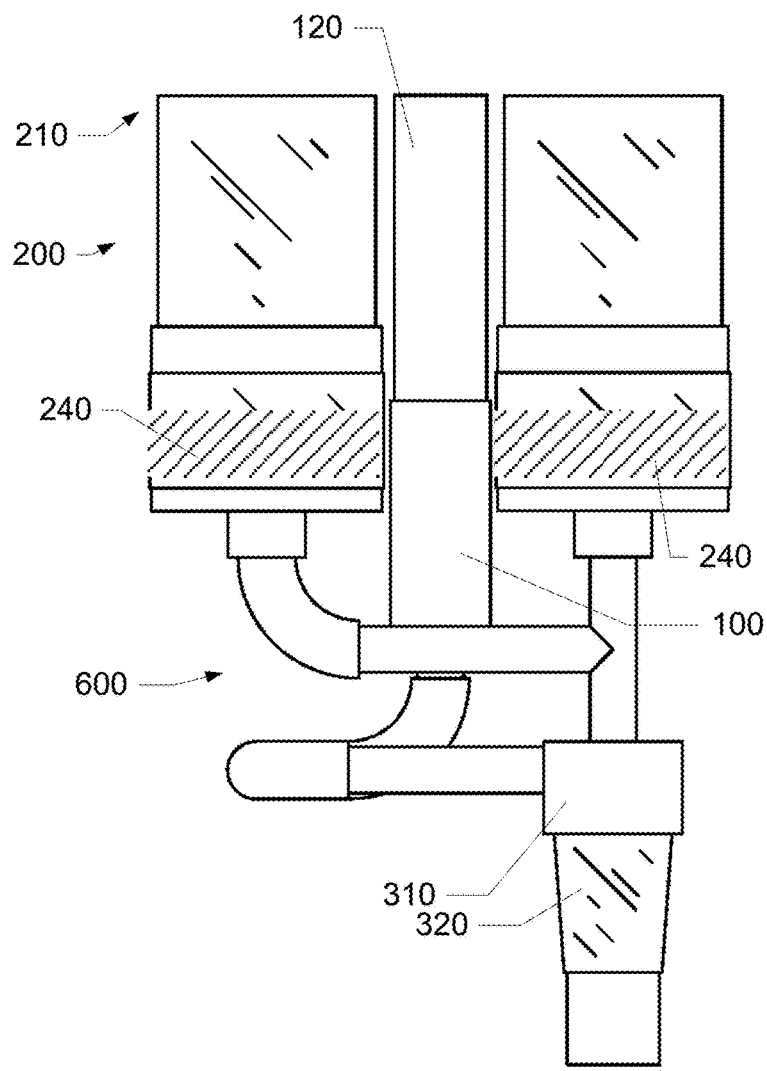
Figure 15:
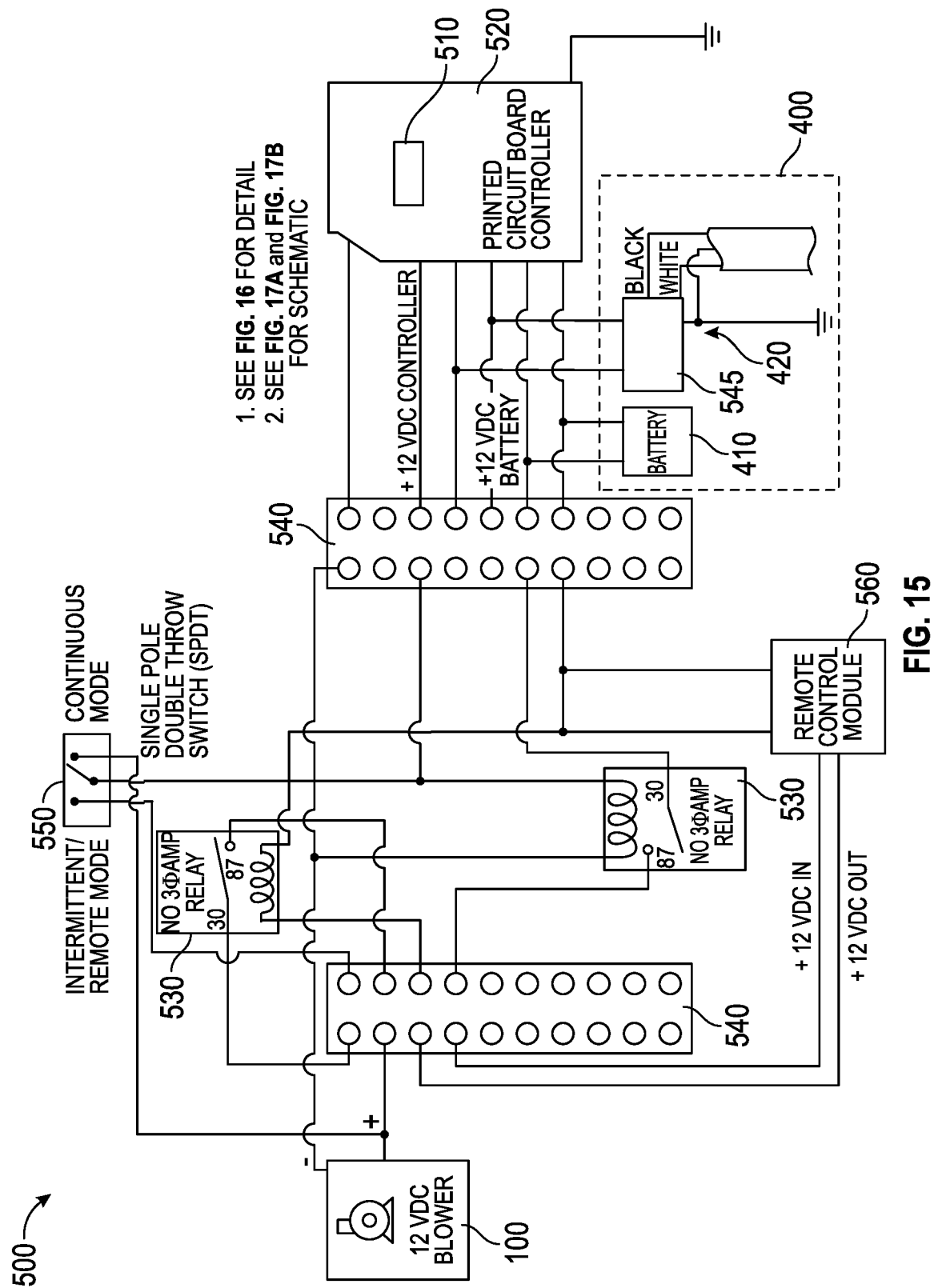
FIG. 15 is a schematic drawing of a control system and power system according to one embodiment.

After air entering the PCDAM flows through the blower/fan 100, the airflow enters a filtering manifold system 300 where it is expanded and thus filtered to capture dust or other particulates prior to flowing through the $CO_2$ absorbing devices 200, preventing this potential matter from being emitted to the surrounding environment through the outlet portion 210. In one aspect, the positive pressure generated by the blower/fan 100 draws environmental air into the manifold system 300 and then through the $CO_2$ absorbing devices 200. As shown in FIGS. 6 and 11-12, the manifold system 300 includes a manifold housing 310 that defines an expansion chamber 320 having an expanded control volume sufficient to momentarily reduce the velocity of air traversing the manifold 300 system. In other embodiments, the manifold system 300 may be configured to use baffles or cyclonic separation. Residual dust from $CO_2$ absorbent 240, any other foreign particulates, and/or moisture produced from the absorption of $CO_2$ in the $CO_2$ absorbing device 200, are collected within the manifold chamber 320. In one embodiment, the manifold system 300 functions similar to a vacuum trap, and separates the blower/fan 100 input portion 110 of the fluid conduit system 600 from the manifold inlet side 320 of the fluid conduit system, thus protecting the blower/fan 100 and the external environment 20. In another embodiment, the manifold system 300 functions similar to a dropout box, flash evaporator or expansion chamber, and separates the blower/fan 100 input portion 120 of the fluid conduit system 600 from the manifold inlet side 320 of the fluid conduit system.

As shown in several figures, the air drawn in to the PCDAM 10 is directed through the components of the system by the fluid conduit system 600. The conduit system 600 includes plurality of fluid transporting conduits to permit controlled fluid communication between the external environment 20, the fan/blower 100, the $CO_2$ absorbing devices 200, and the manifold device 300. In various embodiments, the fluid conduit system 600 may be constructed of any suitable material including but not limited to poly (vinyl chloride) ("PVC") piping or tubing. In various embodiments, any other suitable materials may be used. To increase the lifespan of the PCDAM, it is desirable to use non-corrosive or non-reactive materials for the fluid conduit system, including the bushings, joints, or other fittings. By way of example, the conduit system may include flexible or rigid conduits composed of polypropylene, polycarbonate, polyethylene, fiberglass, chlorinated polyvinyl chloride (CPVC), polypipe, aluminum, copper, galvanized metal, rubber, butyl, nitrile rubber (e.g., buna-n), buna-s, silicone, neoprene, urethane, ethylene propylene diene monomer (EPDM) rubber, fluoroelastomer, or combinations thereof.

Figure 23:
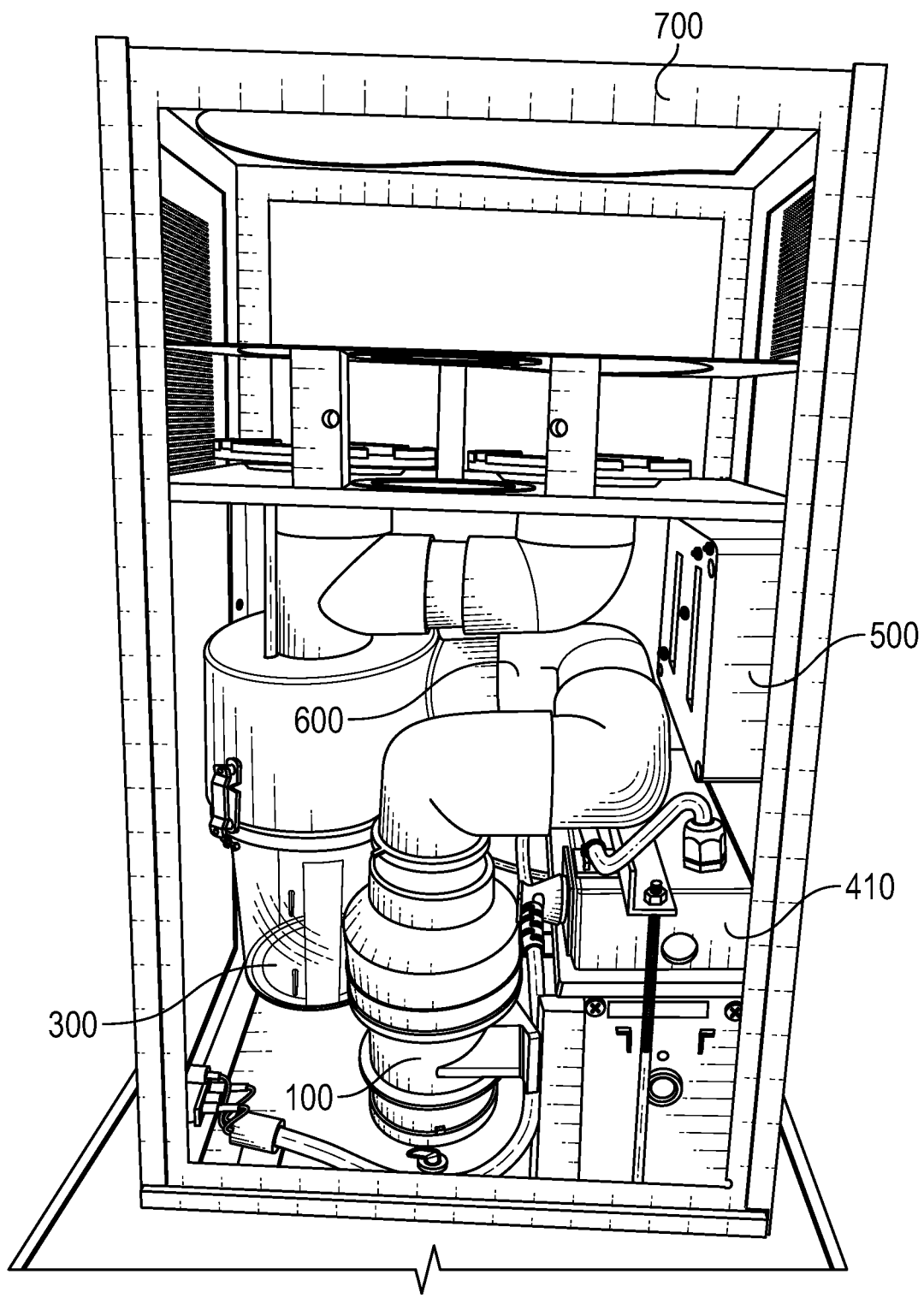
Figure 24:
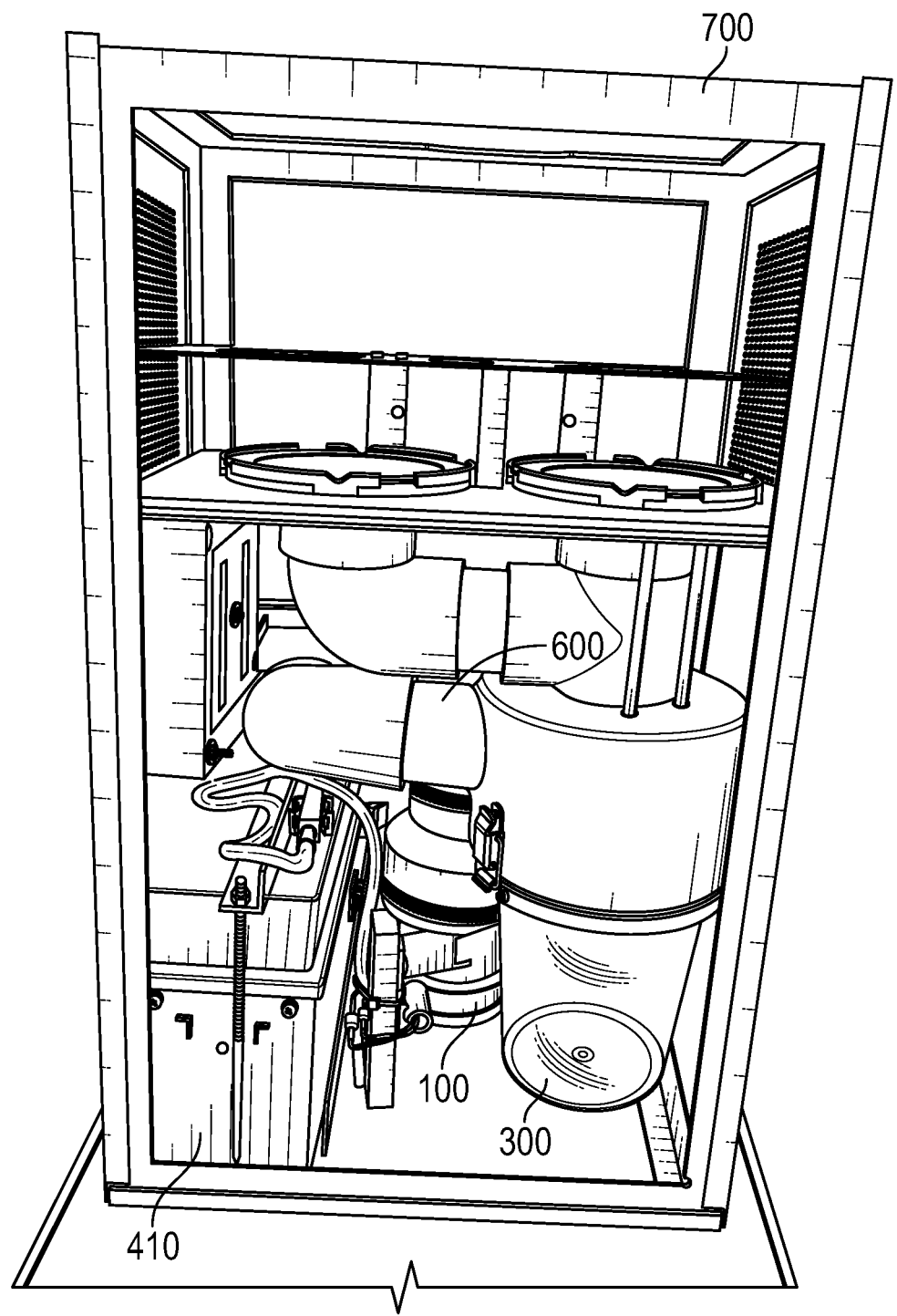
Figure 25:
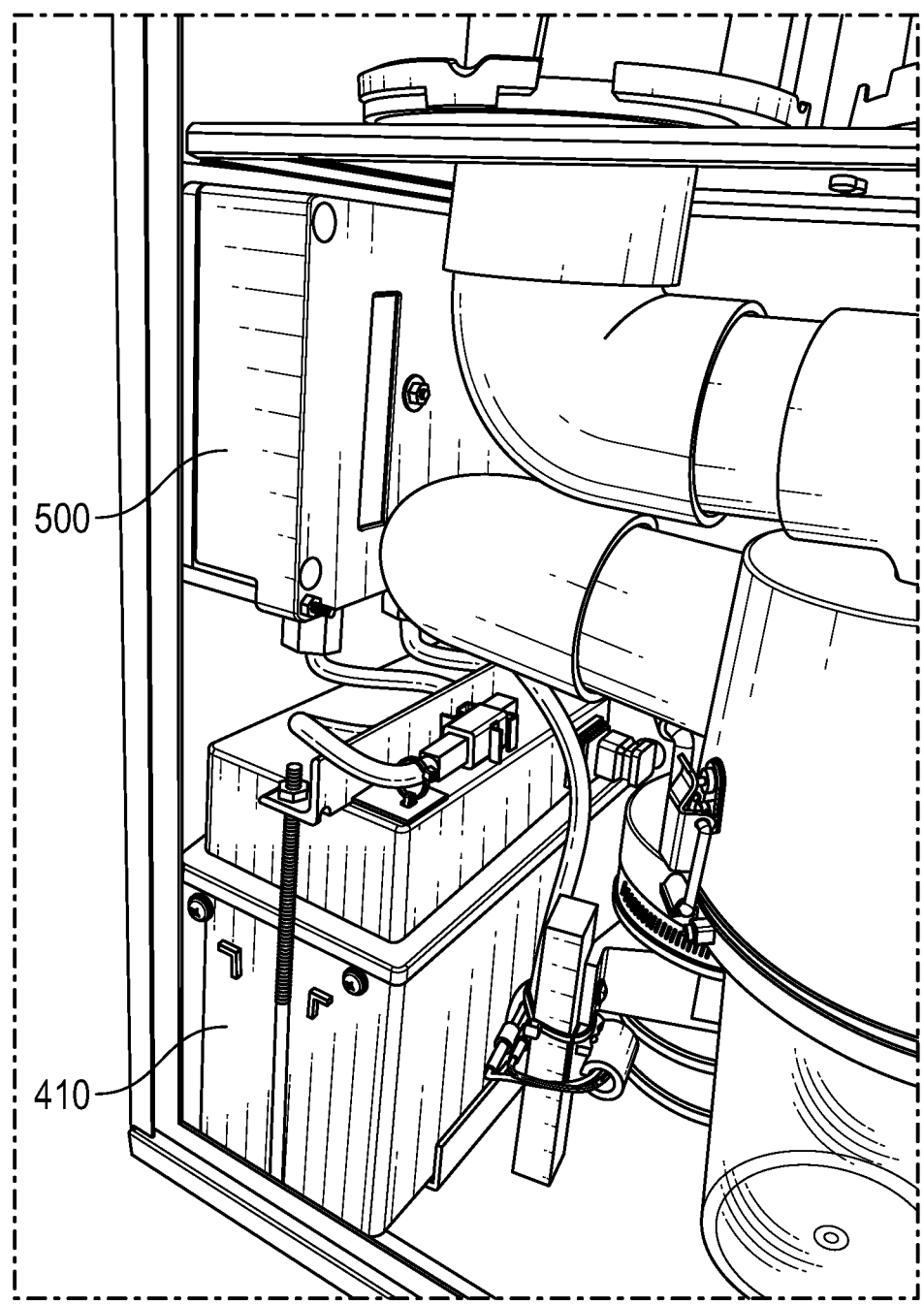
Figure 26:
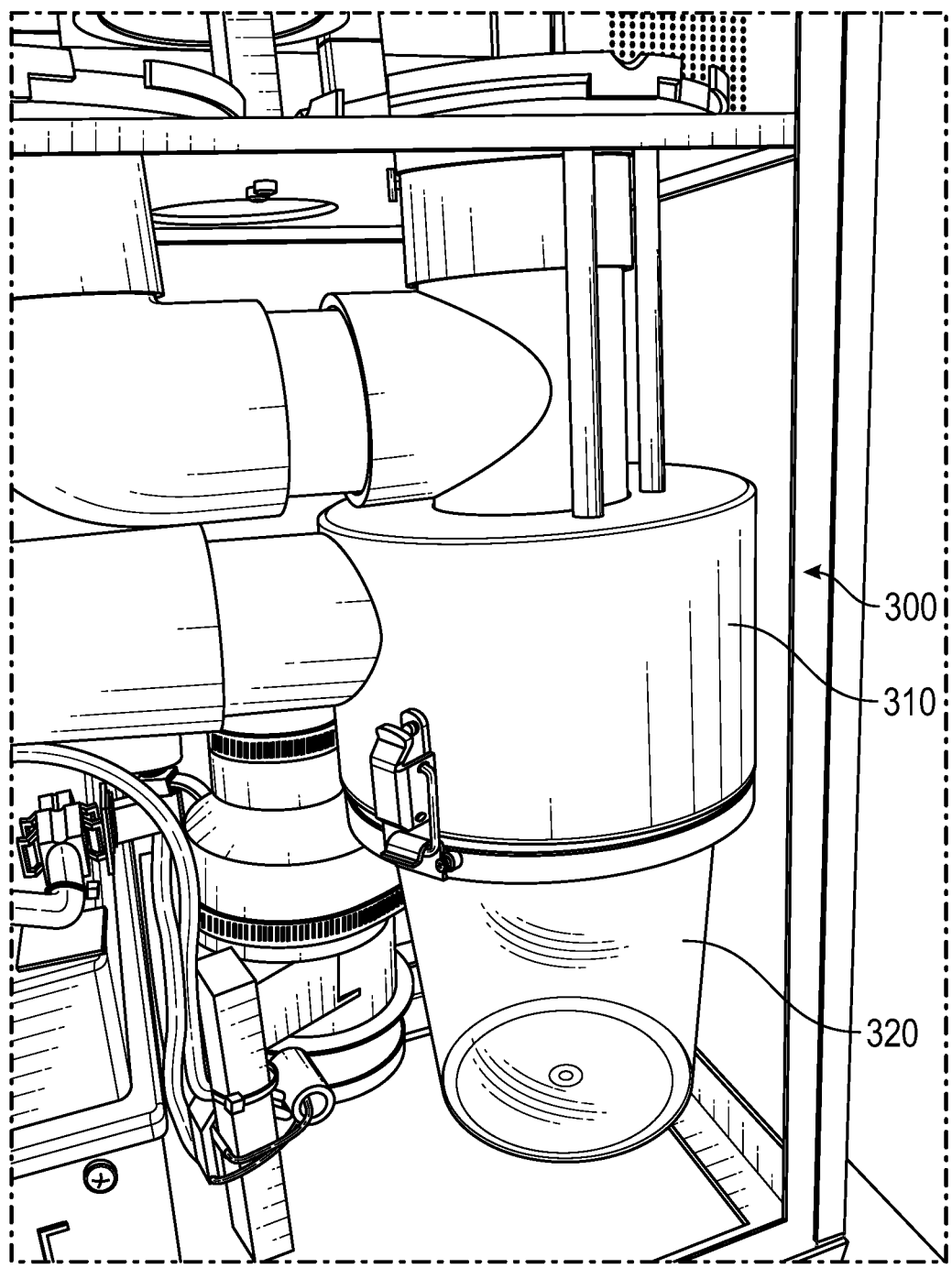
Figure 27:
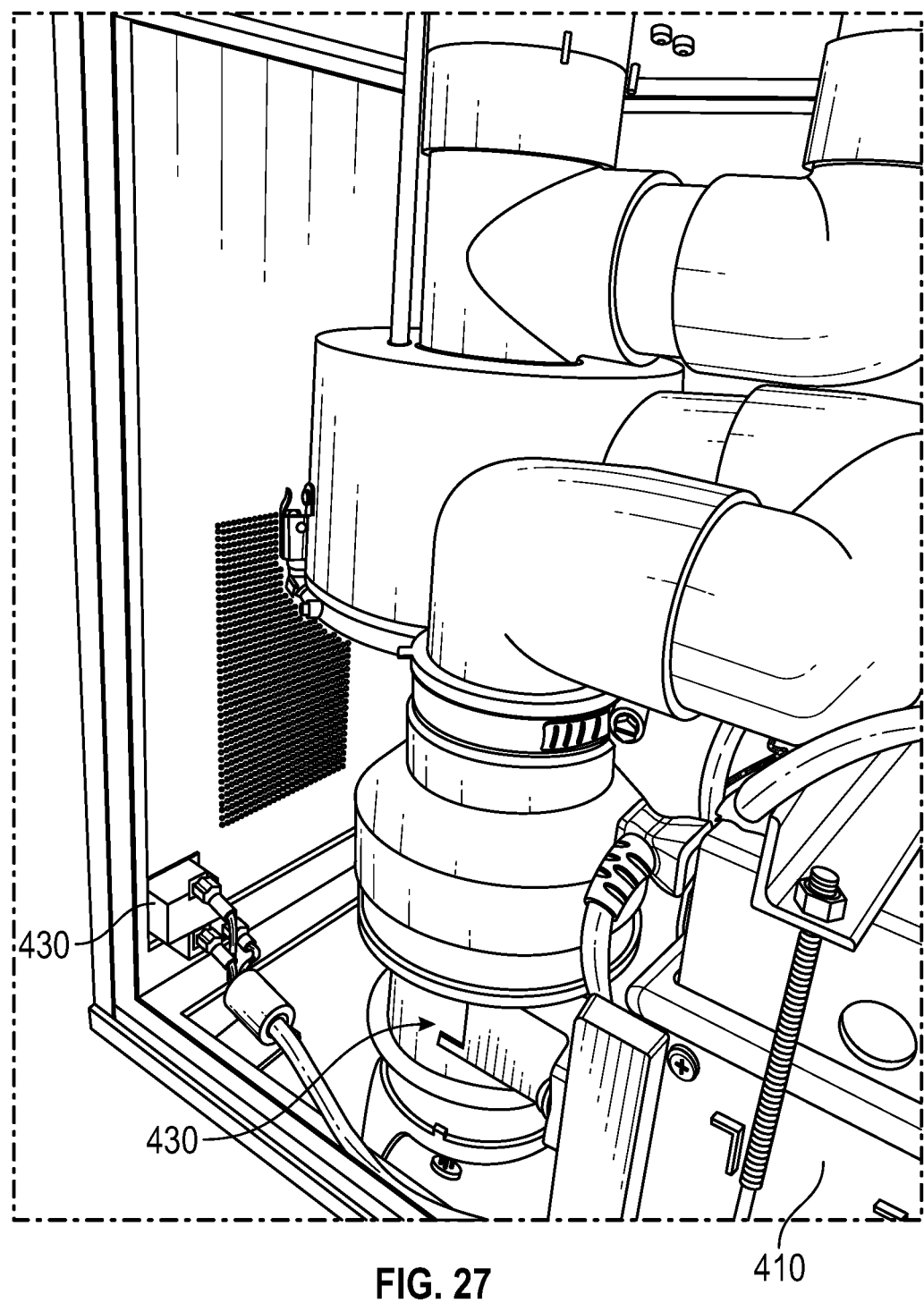
Figure 28:
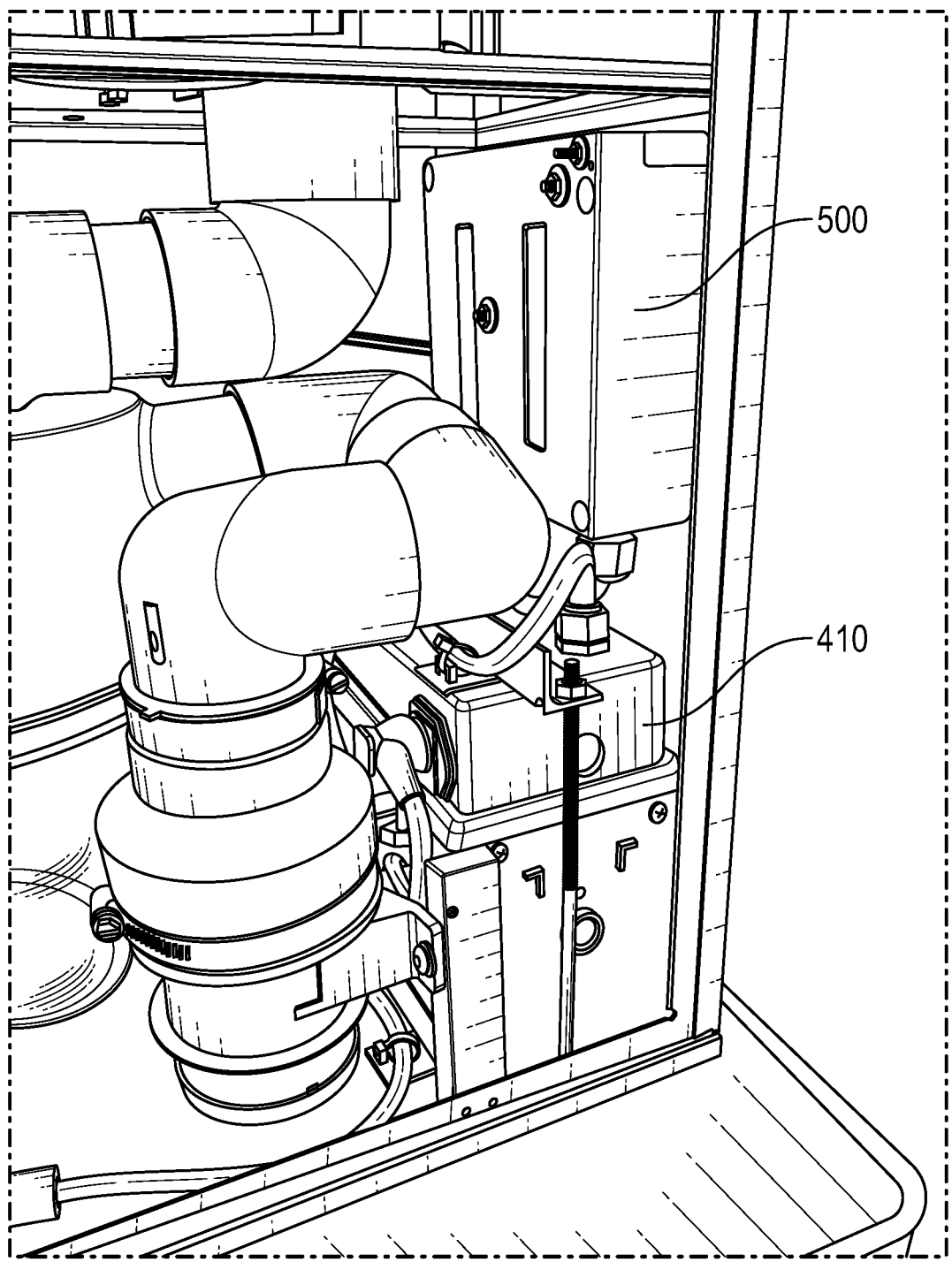
Figure 29:
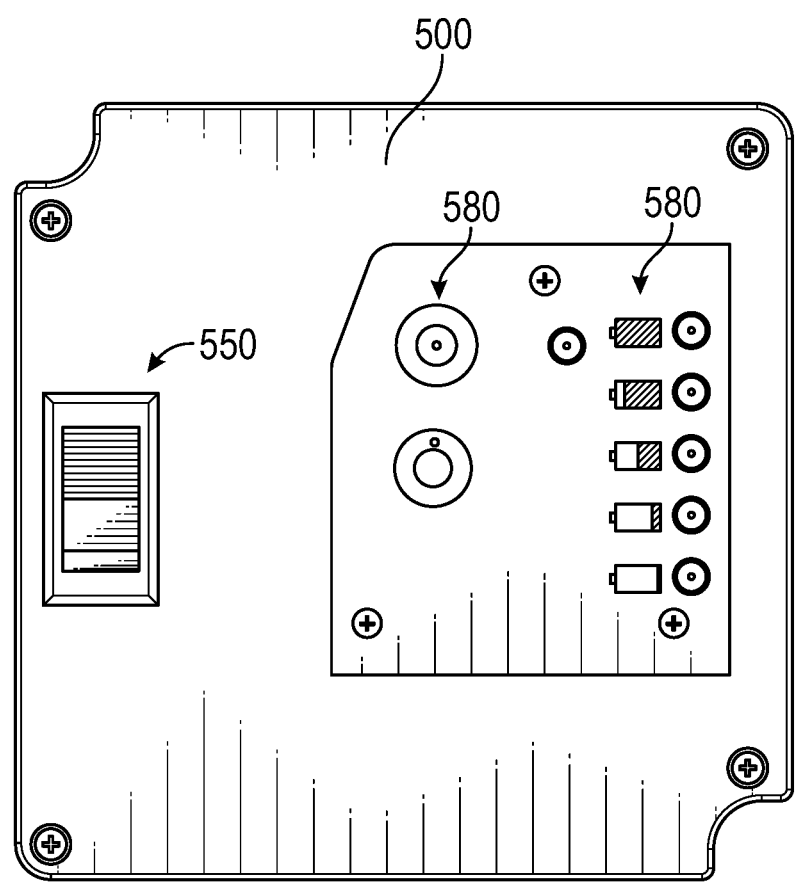
Figure 30:
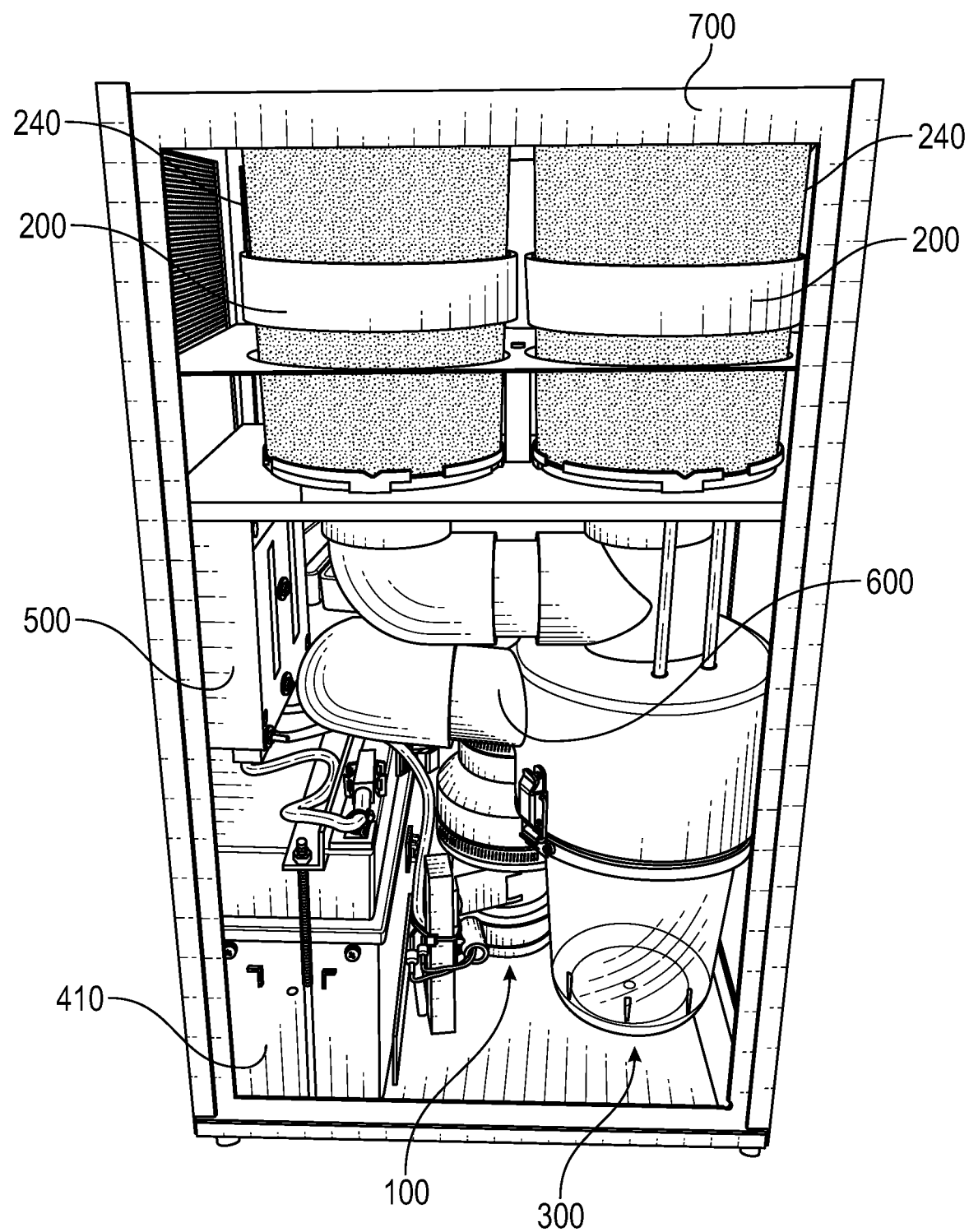
Figure 31:
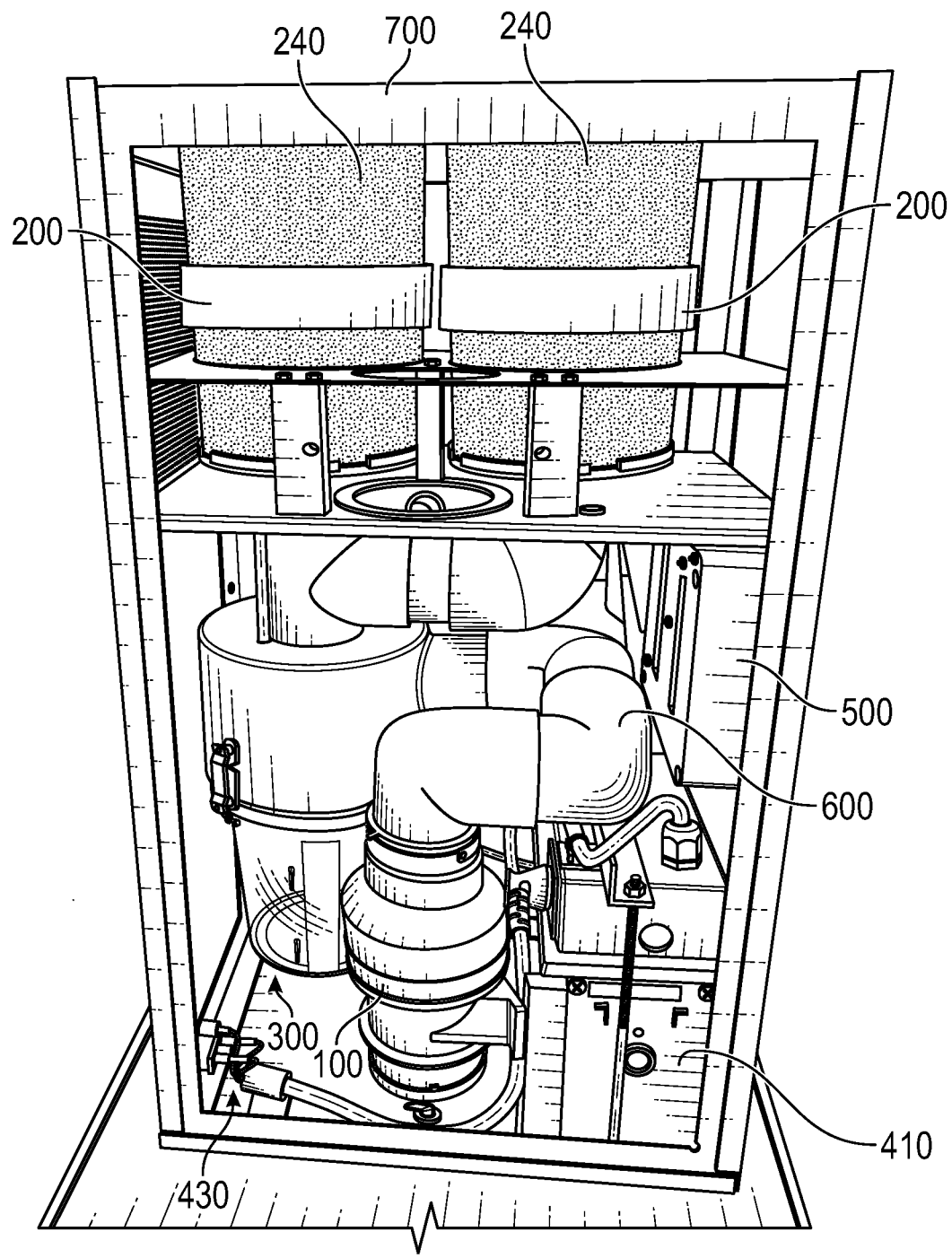

As shown in FIGS. 3, 6, 15, 16, 17A and 17B the PCDAM 10 is powered by a power system 400 and controlled by a control system 500. In various embodiments, the power system 400 includes a battery 410, which may be rechargeable according to at least one embodiment. In one embodiment, the battery may be charged off the plane and loaded prior to flight with a battery life of over 4 hours of continuous run time. In other embodiments, the battery may be charged by any external power supply. For example, the power system 400 may include an internal charger that charges the battery using any suitable external power supply, including those available on the plane. It has been observed that a critical time for $CO_2$ sublimation without proper ventilation is during de-icing or engine start events where the ventilation systems are shut down and closed off to the outside. The battery 410 may be secured to the housing, as shown in FIGS. 23-25.

Figure 20:
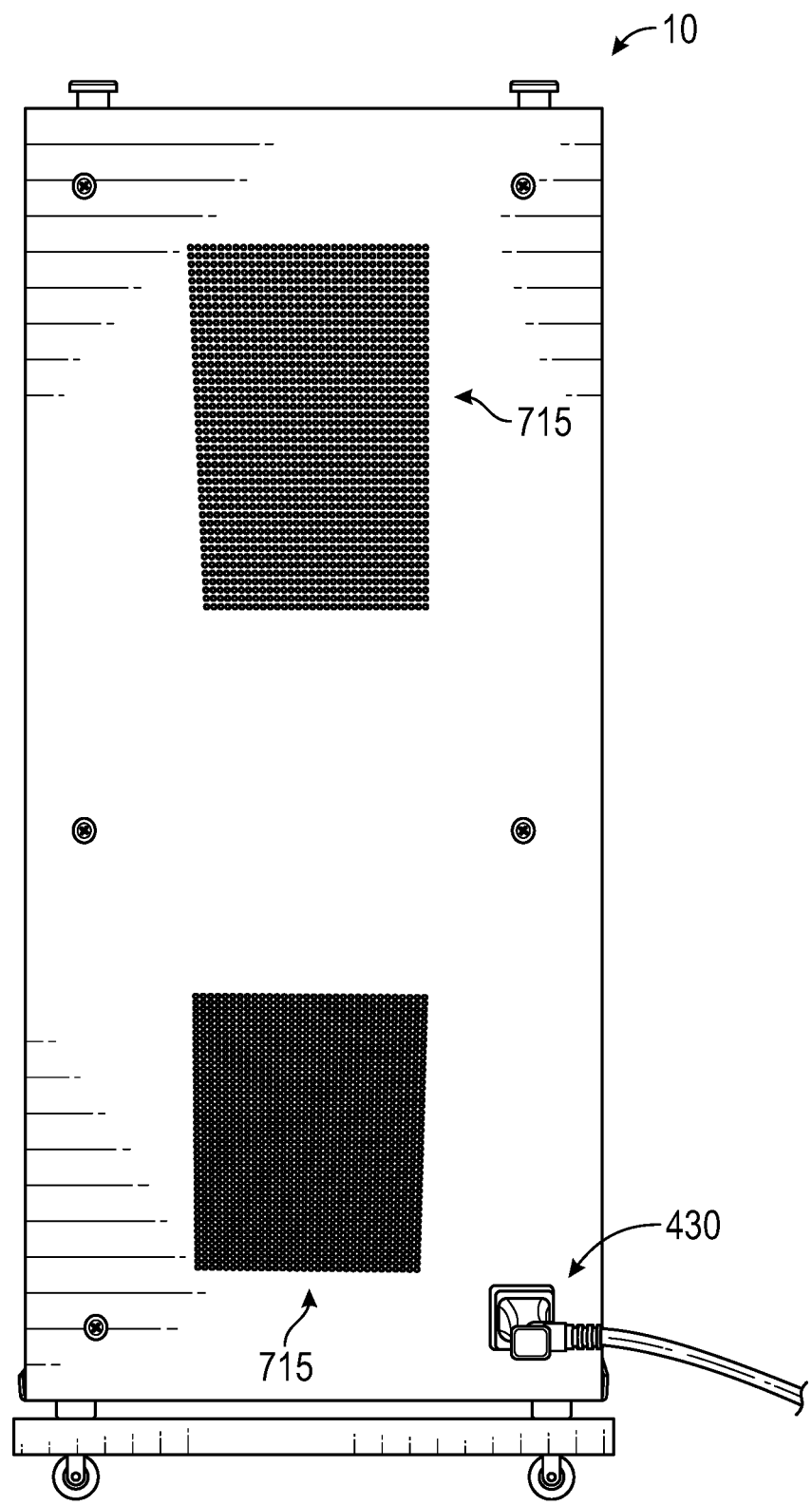
Figure 21:
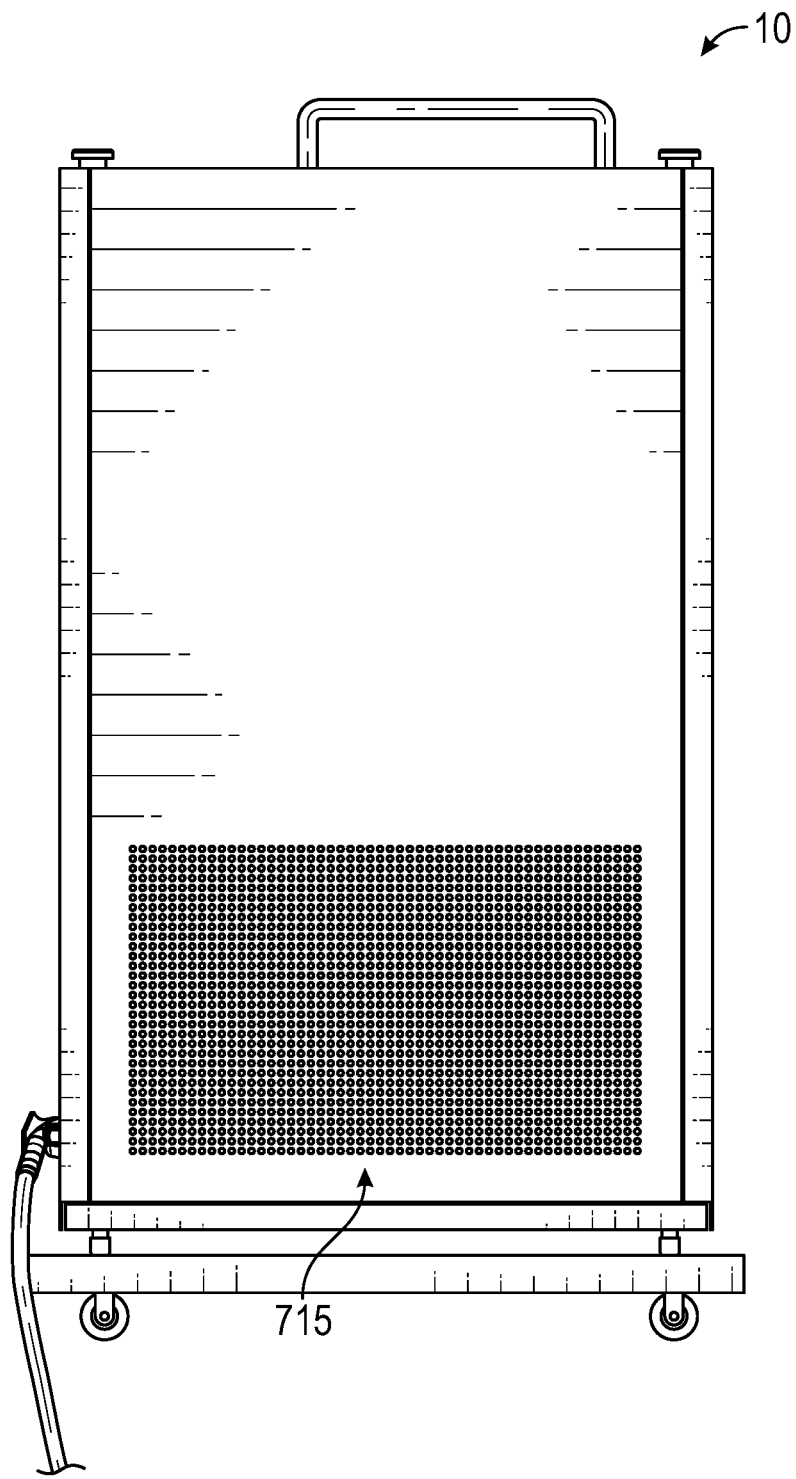

In other embodiments, the PCDAM 10 is powered by direct wiring to an external power supply or plugged into an outlet of an external power system, generally indicated as 430, as shown in FIGS. 20-21. Yet in other embodiments, a combination of a battery and external power supply may provide extended use in remote locations. For example, the PCDAM 10 may operate at maximum performance level when engaged to an external power source, such as an alternating current (AC) power source, when the battery is depleted or charging.

Figure 16:
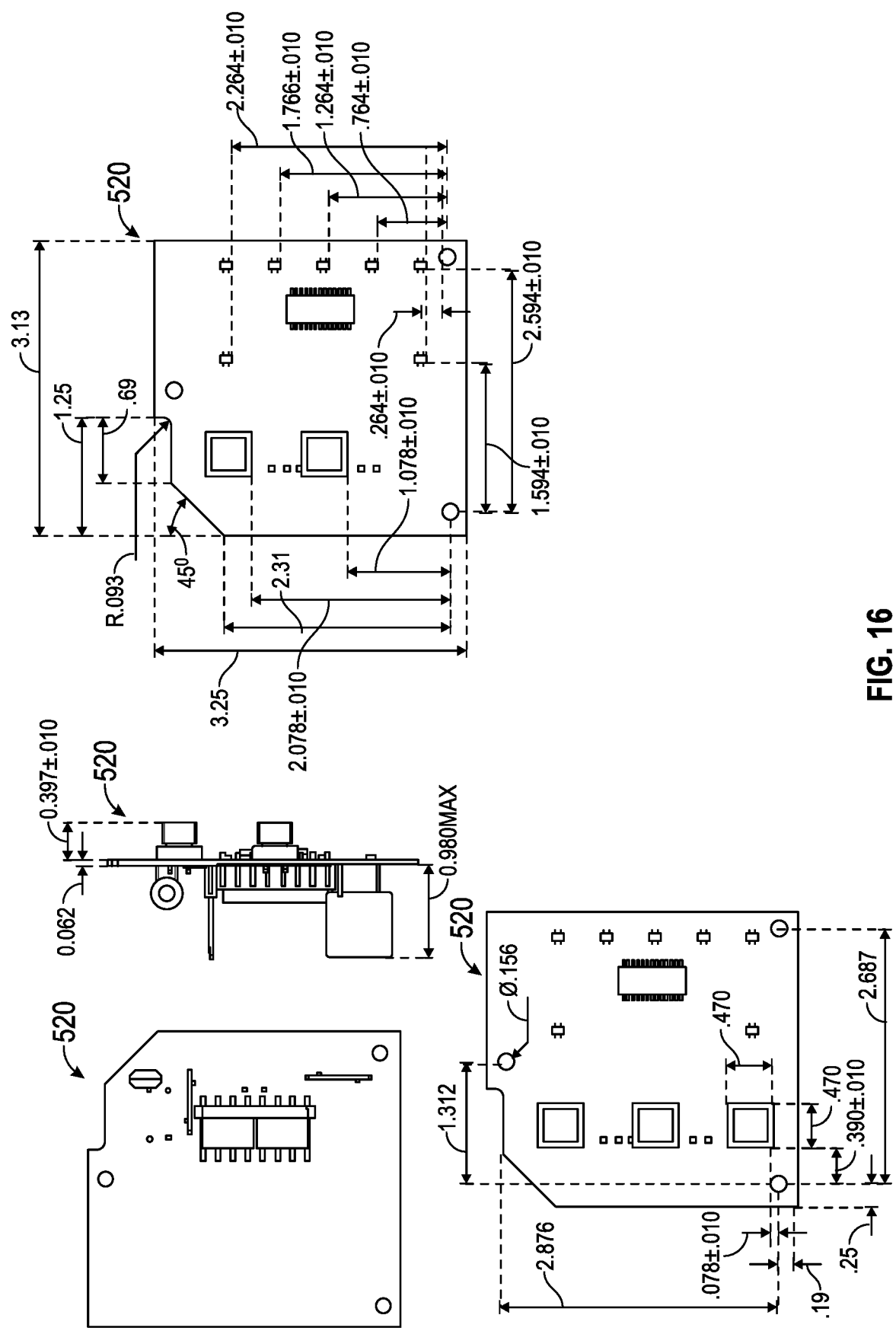
FIGS. 16, 17A and 17B are example schematics of a controller and control circuit, respectively.
Figure 17A:
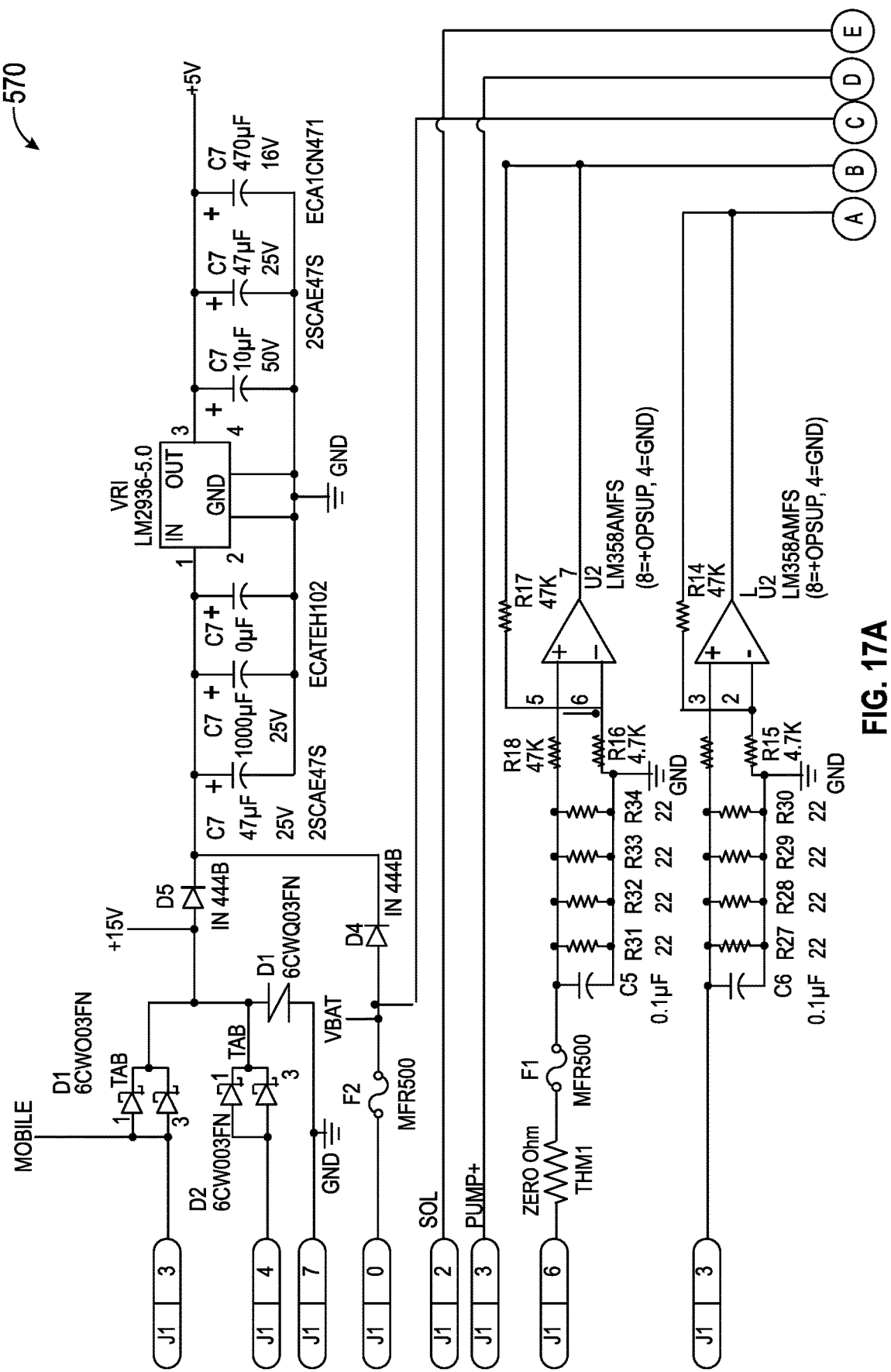
Figure 17B:
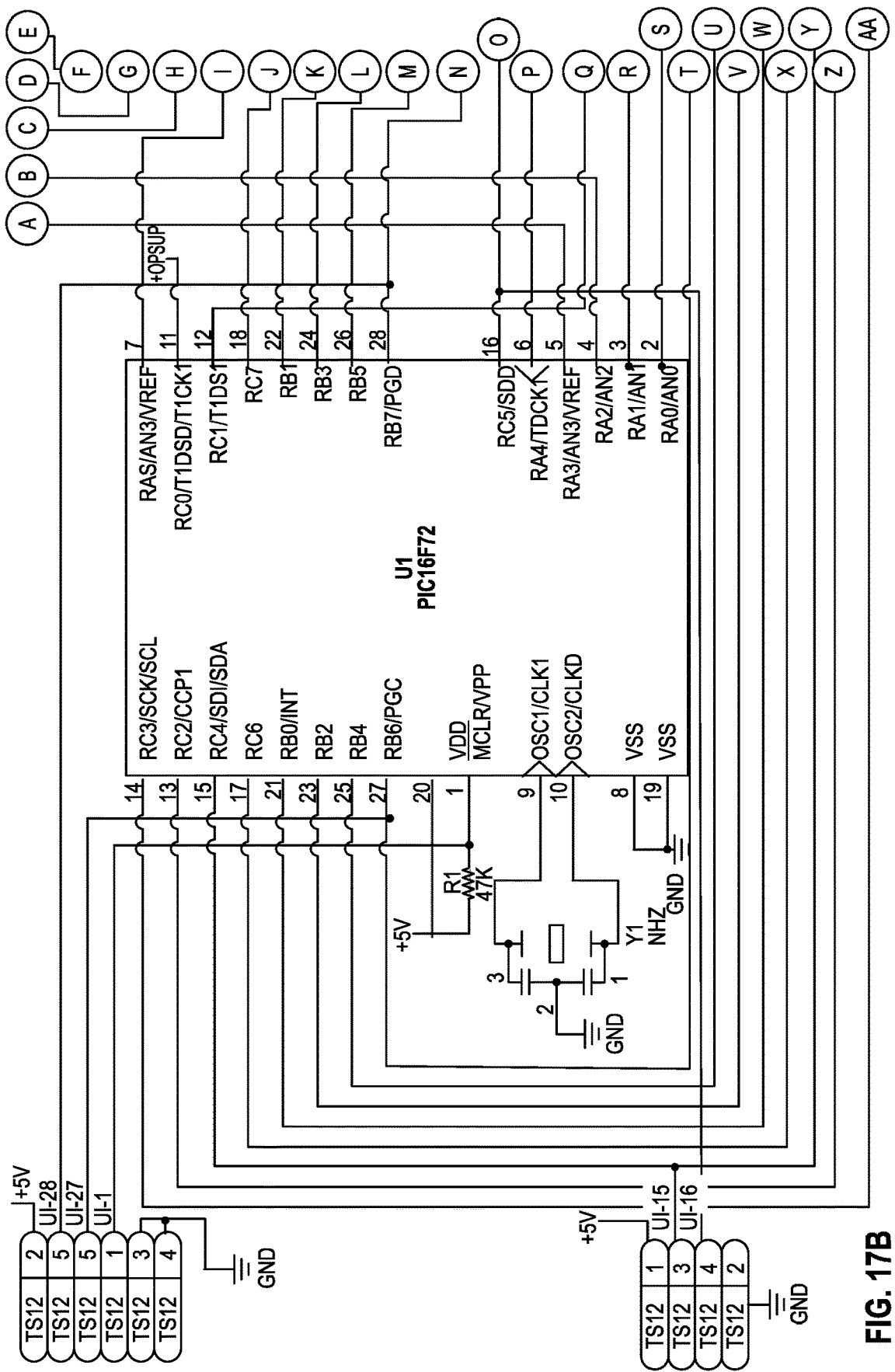
Figure 17B:
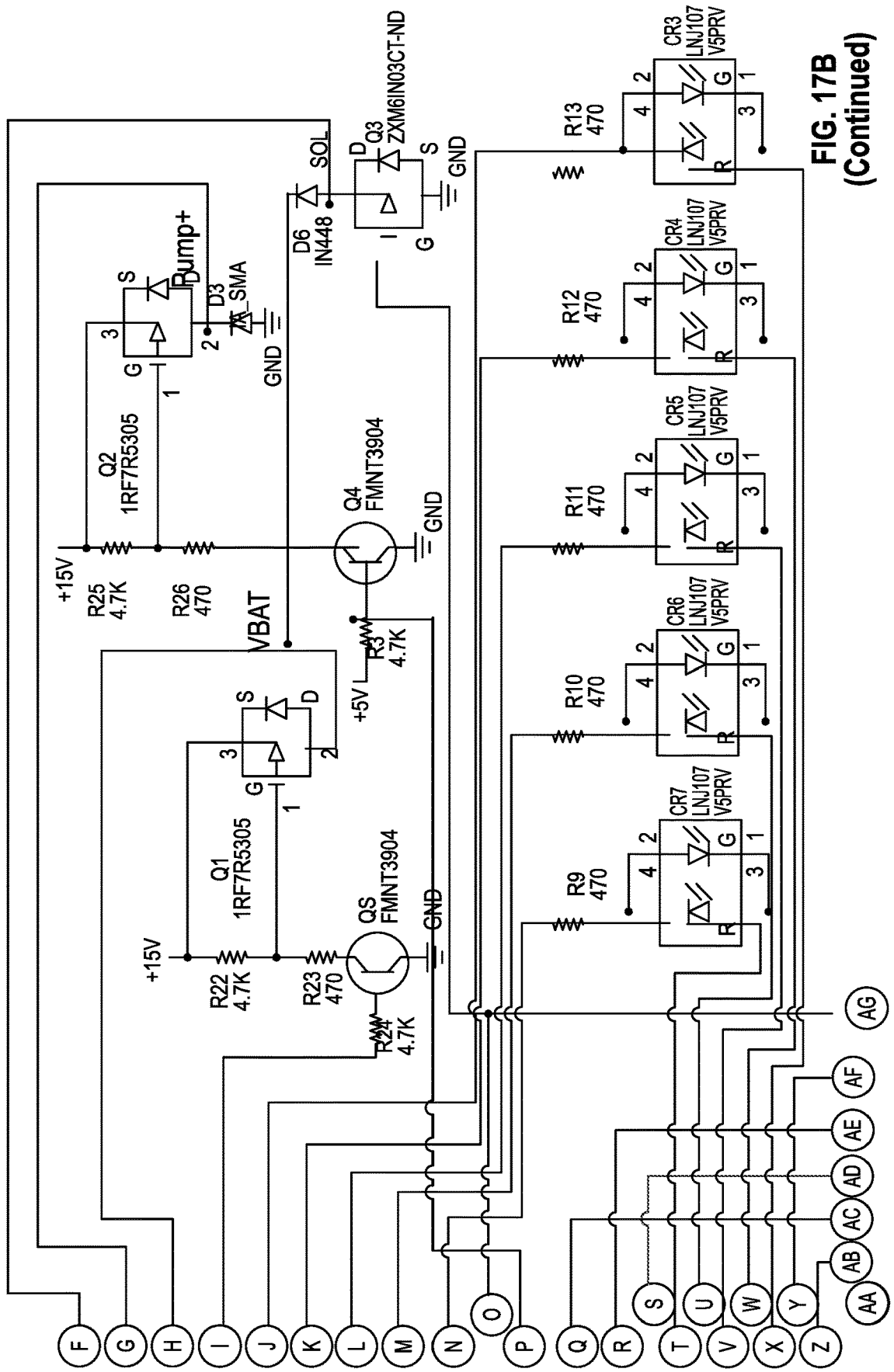
Figure 17B:
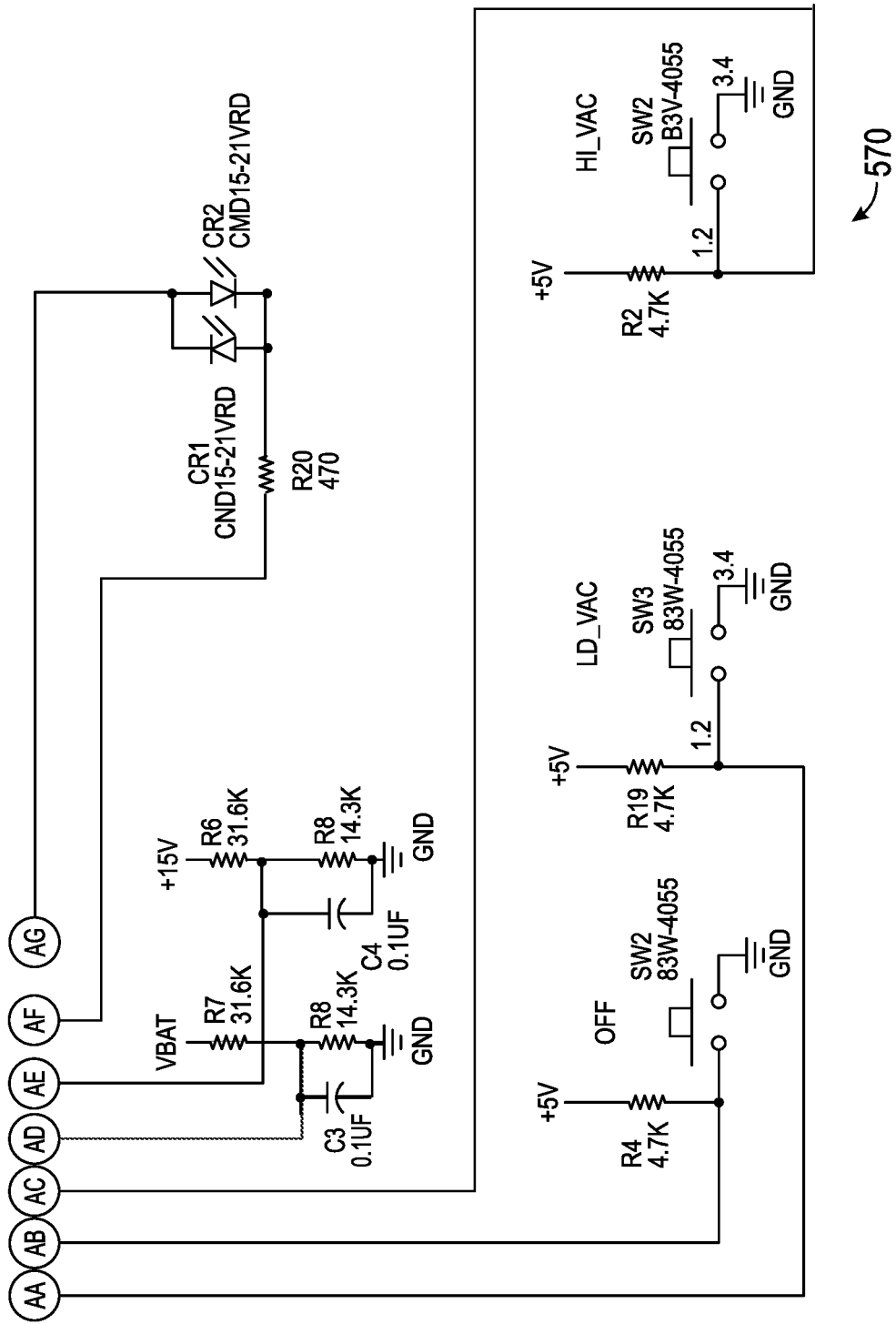
Figure 18:
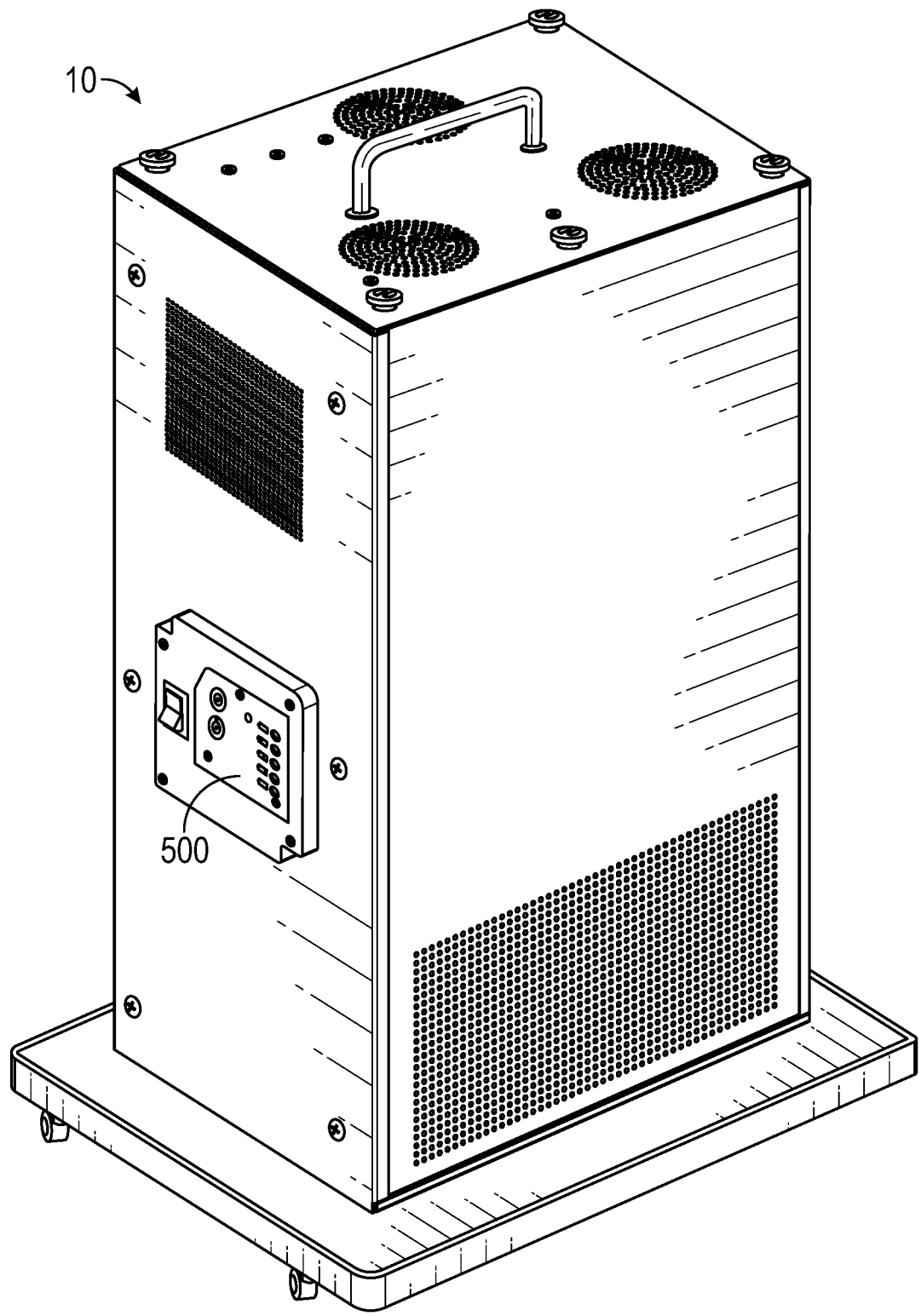
FIGS. 18-31 are photographs of another embodiment of the portable carbon dioxide absorption system according to another embodiment.
Figure 19:
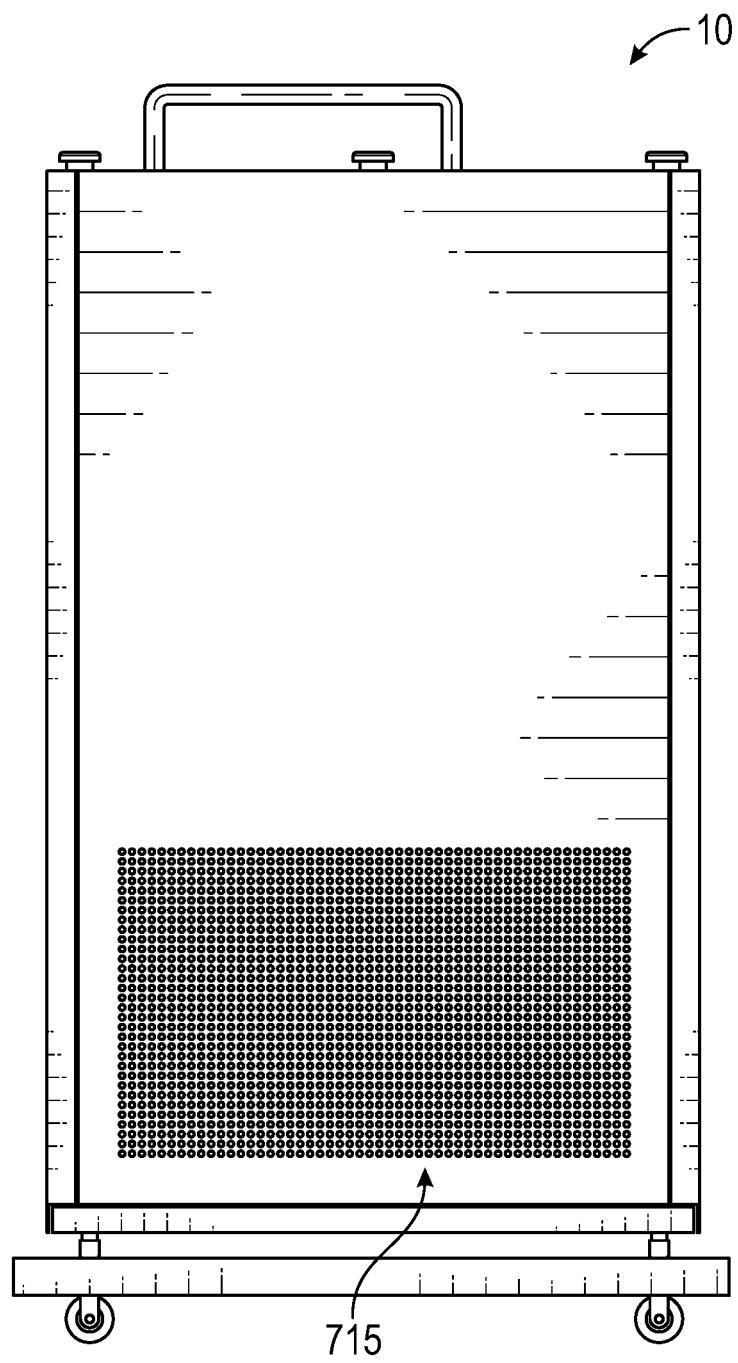

In various embodiments, the control system 500, as shown in FIGS. 3, 6, and 15, 16, 17A, and 17B, includes one or more processors or controllers 510 mounted on a printed circuit board 520. The control system may include other components including, but not limited to, relays 530, terminals 540, converters 545, switches 550, and control modules 560. As shown in various embodiments, the control system is in electrical communication with both the battery 410 and an external power system 420. The control system may also include sensors to monitor $CO_2$ levels in the environmental air, alarms, displays, audio/visual indicators, generally indicated as 580, or combinations thereof, that allow a user to observe operation of the PCDAM 10, including the charging status of the battery 410. By way of example and not limitation, a schematic for one embodiment of a controller 510 is shown in FIG. 16, while FIGS. 17A and 17B illustrate an example circuit diagram of a control system circuit 570. The controllers and circuits shown in FIGS. 16, 17A and 17B are provided as illustrative examples only and do not limit the scope of the systems and components used to power and control the PCDAM 10.

According to various embodiments, the PCDAM 10 may operate in a continuous operation mode to provide continual $CO_2$ monitoring and absorption. Alternatively, the control system 500 may operate the PCDAM in an intermittent mode where the environmental $CO_2$ levels are monitored and the blower/fan 100 is activated when a threshold value for $CO_2$ concentration has been reached and the PCDAM automatically operates to reduce the $CO_2$ level. In yet another configuration, the PCDAM 10 may be operated remotely as desired.

Figure 2:
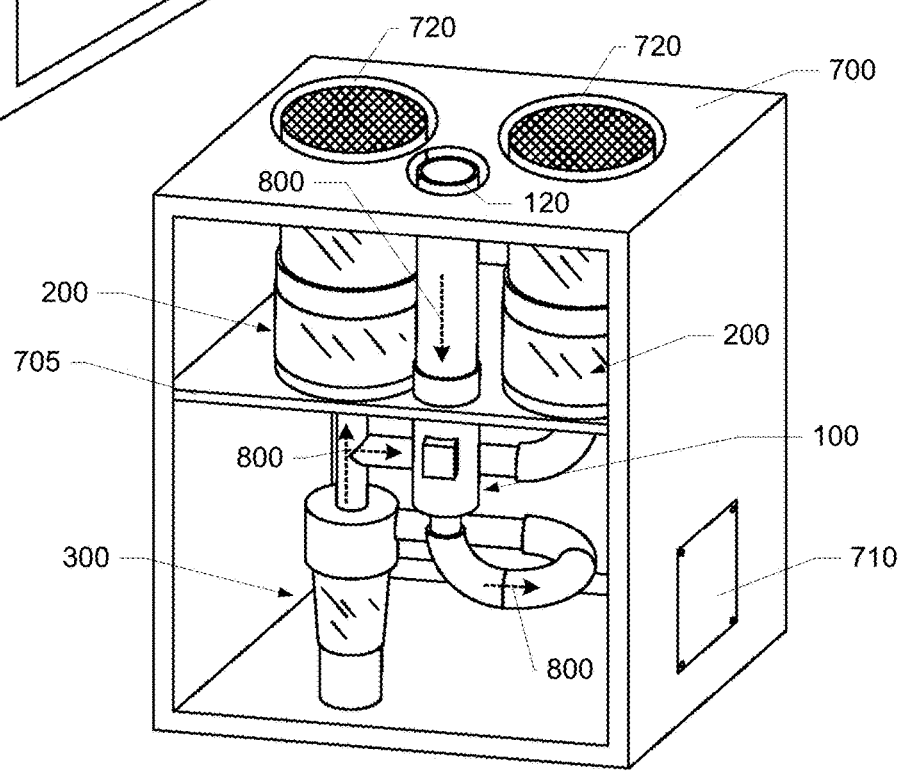
FIG. 2 is a rear perspective view of a portable carbon dioxide absorption system with portions of the exterior housing removed according to one embodiment.
Figure 3:
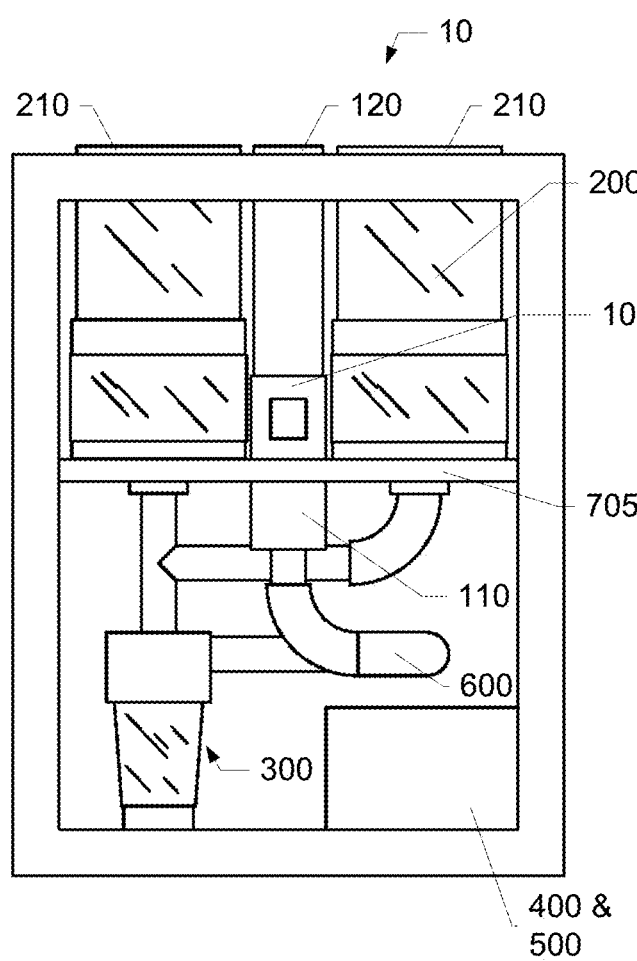
FIG. 3 is a rear elevation view of a portable carbon dioxide absorption system with portions of the exterior housing removed according to one embodiment.
Figure 4:
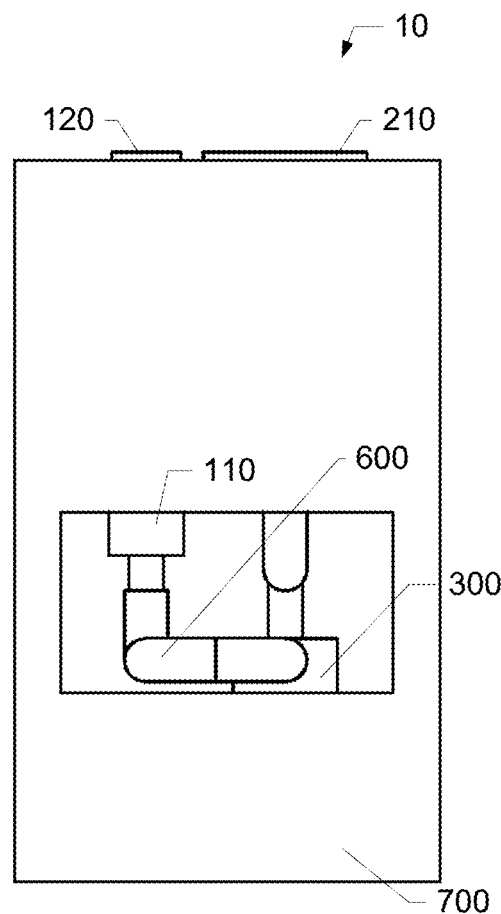
FIG. 4 is a side elevation view of a portable carbon dioxide absorption system with portions of the exterior housing removed according to one embodiment.

The housing 700 is typically a rigid structure that protects the internal components of the PCDAM 10. By way of example and not limitation, the housing 700 may be composed primarily of aluminum. As shown in FIGS. 2 and 5, among others, the top surface of the housing includes one or more apertures 720 aligned with each of the $CO_2$ absorption devices 200. In one aspect, the housing 700 functions as a faraday cage to intrinsically shield the interior components from static electric fields and certain types of harmful electromagnetic pulses for reliable and safe use in hospitals, laboratories, airplanes, and military applications where sensitive electronics may be present. As shown in FIGS. 1 and 2, among others, the housing 700 may include one or more support structures 705 and one or more access panels 710 or vents 715 to permit access to the interior of the housing. Similarly, the housing may include several openings 720 where the exhaust portion 210 and the inlet portions 120 of the absorbing devices 200 are in fluid communication with the environment external to the housing 700, as shown in FIGS. 5 and 22. In one aspect, the outlet portions 210 and inlet portion 120 may protrude from the housing 700. In other embodiments, the outlet portions 210 and inlet portion 120 may be flush with the exterior surface of the housing 700 or remain below the exterior surface of the housing. For example, when the outlet portions 210 and inlet portion 120 are recessed below the exterior surface, the openings 720 may remain separate and distinct or they may be configured as a single contiguous opening. Regardless of opening configuration, when the outlet portions 210 and inlet portion 120 are recessed below the exterior surface, the openings 720 may optionally have a protective screen or other vented covering.

In various other embodiments, the openings 720 and corresponding fan inlet portion 120 and absorbing device outlet port(s) 210 are not proximal to one another, nor are they limited to the top surface of the housing 700. For example, the openings 720 and corresponding fan inlet port(s) 120 and absorbing device outlet portions 210 may be positioned on any other portion of the housing, including but not limited to the front, back, sides, and bottom portions (when the device is elevated or not resting on a solid surface).

Various embodiments of the PCDAM 10 may be used to perform to various processes and methods for automatically reduce $CO_2$ concentrations and maintain suitable $CO_2$ concentrations in an enclosed environment. By way of example, after placing the PCDAM 10 in the enclosed environment, the environmental concentration level of $CO_2$ in the enclosed environment may be continuously measured using a sensor in communication with the control system 500 of the PCDAM. Based upon the measured data, the processor 510 of the control system 500 determines if the environmental concentration level of $CO_2$ exceeds a predetermined threshold. In one aspect, the threshold is determined at least in part on the volume of the enclosed area and the anticipated increase in $CO_2$. While monitoring the environmental $CO_2$ levels, the processor 510 continuously or intermittently operates the blower 100 to draw environmental air into the PCDAM 10. As previously described, the PCDAM 10 absorbed $CO_2$ from air travelling through the device, thus the concentration of $CO_2$ in the air emitted from the PCDAM 10 is less than the environmental concentration level, thereby reducing the environmental concentration level. Lastly, once the environmental $CO_2$ level is below the threshold, the controller 510 automatically reduces or ceases operation of the blower 100.

Figure 32:
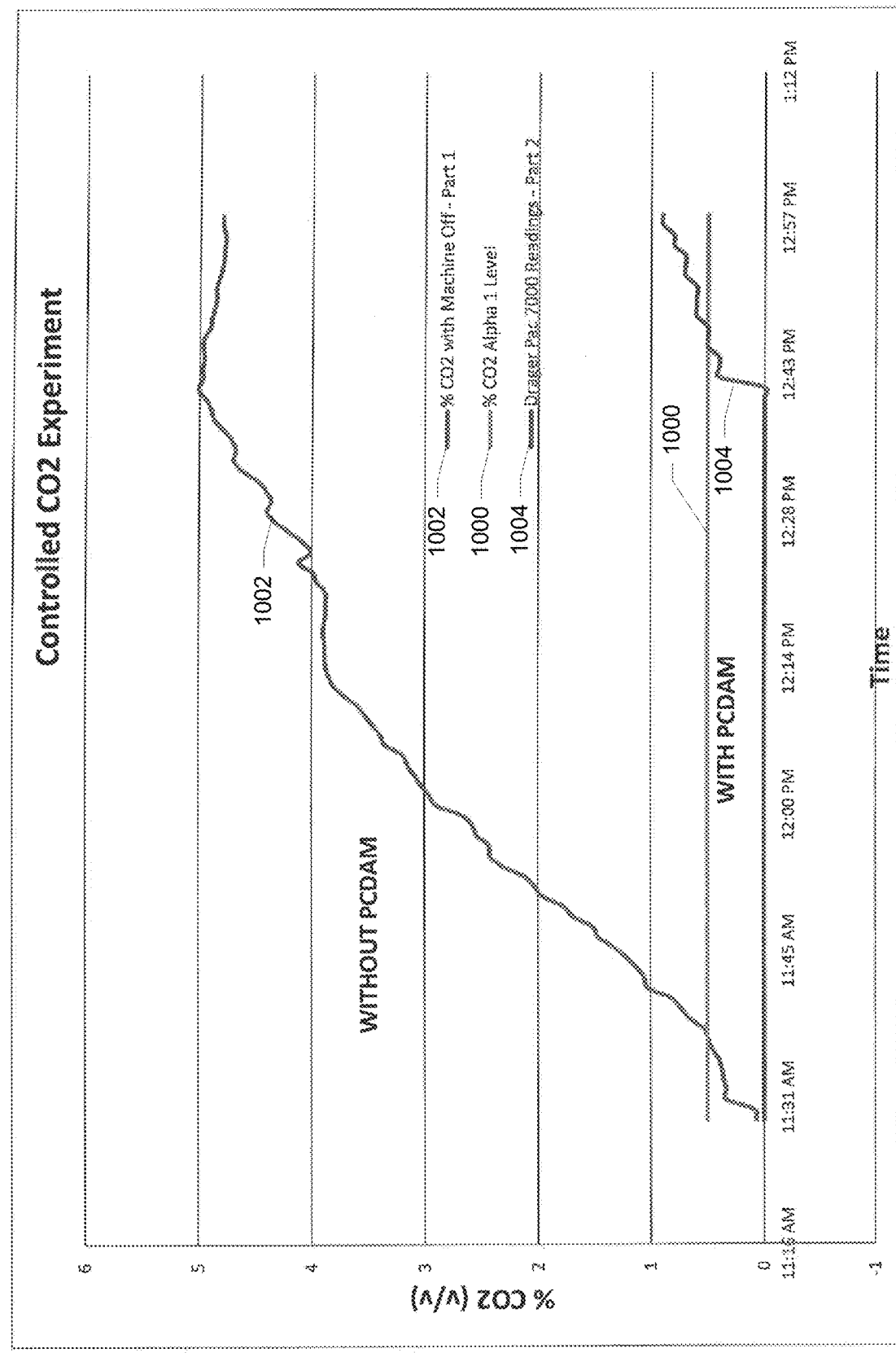
FIG. 32 is a graph showing $CO_2$ absorption levels over time with the portable carbon dioxide absorption system operating in various states, of according to one embodiment.

FIGS. 32 and 33 display experimental performance data for an embodiment of the PCDAM 10. In one experiment, an isolated controlled space or control volume (e.g. a room) was filled with carbon dioxide ($CO_2$) gas at a constant rate of 7.4 liters per minute. The experiment was conducted in two parts, both under the same conditions. In the first part, a control experiment was conducted where the PCDAM off, and in the second part the PCDAM was in operation. A calibrated $CO_2$ Data logger was used in the first part of the experiment to record real-time concentrations of $CO_2$, recorded as % volume/volume (v/v). Similarly, Drager Pac 7000 $CO_2$ gas monitor was used in the second part of the experiment to record real-time concentrations of $CO_2$, as % volume/volume (v/v). The Drager Pac 7000 $CO_2$ gas monitor was worn by a person, disposed in a seated position within the room to provide an accurate simulation.

As shown in FIG. 32, the line 1000 indicated as the % $CO_2$ Alpha 1 level, illustrates the 0.5% $CO_2$ (5,000 parts of $CO_2$ per million parts of air) gas (v/v) concentration exposure limit used by the Department of Labor (DOL) and Occupational Safety and Health Administration (OSHA) as an 8-hour time weighted average Permissible Exposure Limit (PEL) in general industries. In one embodiment, the PCDAM 10 operates in an automated mode for continuous atmosphere monitoring where the PCDAM automatically initiates and stops absorption at a specific concentration or a specific threshold. This threshold data an instructions to operates the PCDAM 10 may be stored in memory and executed by a processor of a computing device. By way of example and not limitation the threshold may correspond to the DOL and OSHA PEL. Similarly, data related to the volume or absorbency of the $CO_2$ absorption material 240 may be stored in memory such that an alarm or other indicator is triggered when the absorbent material is at 10%, 5% or requires immediate replacement.

The elevated line 1002, indicated as "% $CO_2$ with Machine Off-Part 1" represents the increase or rate of volumetric growth of % $CO_2$ gas (v/v) concentration in the room while filling the room at a rate of approximately 7.4 liters of $CO_2$ per minute for approximately 89 minutes with the PCDAM 10 turned off. It can be deduced from the data shown that the concentration of $CO_2$ in the room quickly climbs to approximately 5% $CO_2$ gas (v/v) level in the first 71 minutes. Conversely, the line 1004, indicated as "Drager Pac 7000 Readings—Part 2", illustrates the actual readings taken in the room with the PCDAM on, while the room is filled with carbon dioxide ($CO_2$) gas at a constant rate of 7.4 liters of $CO_2$ per minute (similar to part 1). As shown, the PCDAM 10 held the % $CO_2$ gas (v/v) concentration level to 0.0% $CO_2$ gas (v/v) under these conditions for the first 71 minutes (11:29 am-12:40 pm) and below the PEL for a full 75 minutes (11:29 am-12:44 pm).

As shown, the PCDAM 10 kept the room under the alpha 1 PEL of 0.5% $CO_2$ gas (v/v) for the first 75 minutes. It can be extrapolated that approximately 530 total liters of $CO_2$ gas or over 7 liters of $CO_2$ gas/per minute was absorbed over this 75 minute period to achieve this control.

While the present disclosure has been described referring to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined through components differently in various embodiments of the disclosure or described with different terminology. These and other variations, modifications, additions, and improvements may fall within the scope of the disclosure as defined in the claims that follow.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and the following claims intend to encompass and include such changes.

What is claimed is:

1. A portable carbon dioxide ($CO_2$) absorption device comprising:
   a housing defining an inlet and an outlet;
   a blower in fluid communication with the inlet, wherein the blower is disposed within the housing and draws air into the housing through the inlet;
   a manifold system in fluid communication with the blower, the manifold system comprising a manifold housing defining an expansion chamber; the expansion chamber disposed within the housing, wherein the expansion chamber filters and reduces a velocity of air received from the blower by expanding a control volume traversing the portable carbon dioxide absorption device;
   a carbon-dioxide absorbing apparatus disposed within the housing, the carbon-dioxide absorbing apparatus in fluid communication with the expansion chamber and the outlet, wherein the carbon-dioxide absorbing apparatus absorbs carbon-dioxide from the air exiting the expansion chamber of the manifold housing; and
   a power supply disposed within the housing and in electrical communication with the blower.

2. The portable carbon dioxide absorption device of claim 1, wherein the blower generates a positive pressure within the portable carbon dioxide absorption device to pull air into the inlet and push the air through the expansion chamber of the manifold housing and the carbon-dioxide absorbing apparatus.

3. The portable carbon dioxide absorption device of claim 1, further comprising:
   a control system disposed within the housing and operatively engaged to the power supply and the blower, wherein the control system operates the blower to generate a desired airflow rate.

4. The portable carbon dioxide absorption device of claim 3, further comprising:
   a sensor disposed within or proximal to at least one of the inlet, the outlet, the housing, the blower, the manifold system, or the carbon-dioxide absorbing apparatus,
   wherein the sensor is in communication with the control system to monitor an environmental concentration of $CO_2$ proximal to the sensor, wherein the control system receives data from the sensor to automatically operate the blower in such a manner to maintain environmental $CO_2$ concentration below a desired threshold.

5. The portable carbon dioxide absorption device of claim 1, wherein the power supply includes a rechargeable battery.

6. The portable carbon dioxide absorption device of claim 5, wherein the outlet has an outlet width greater than an inlet width of the inlet.

7. The portable carbon dioxide absorption device of claim 5, wherein at least one of the inlet or the outlet comprises a screen or other vented covering.

8. The portable carbon dioxide absorption device of claim 1, wherein the carbon-dioxide absorbing apparatus further comprises a $CO_2$ absorbing material.

9. The portable carbon dioxide absorption device of claim 8, wherein the $CO_2$ absorbing material comprises one or more derivatives of ammonia.

10. The portable carbon dioxide absorption device of claim 9, wherein the one or more derivatives of ammonia is monoethanolamine.

11. The portable carbon dioxide absorption device of claim 8, wherein the $CO_2$ absorbing material is provided as a solid, semi-solid, or liquid composition.

12. The portable carbon dioxide absorption device of claim 1, wherein the portable carbon-dioxide absorption device operates at a flow rate in a range between 20 to 60 cubic feet per minute.

13. The portable carbon dioxide absorption device of claim 1, further comprising one or more displays, audio/visual indicators, or combinations thereof.

14. The portable carbon dioxide absorption device of claim 1, wherein the carbon-dioxide absorbing apparatus absorbs approximately seven liters of $CO_2$ per minute.

15. A portable device for carbon dioxide absorption, comprising:
   a housing defining an inlet and an outlet;
   a blower disposed within the housing and in fluid communication with the inlet that draws air into the housing through the inlet;
   a manifold system defining a manifold housing in fluid communication with the blower, the manifold housing comprising:
      an expansion chamber disposed within the housing that filters and reduces a velocity of air received from the blower by expanding a control volume traversing the housing; and
   a carbon-dioxide absorbing apparatus disposed within the housing, the carbon-dioxide absorbing apparatus in fluid communication with the expansion chamber and the outlet, wherein the carbon-dioxide absorbing apparatus absorbs carbon dioxide from air exiting the expansion chamber.

16. The portable device of claim 15, wherein the blower generates a positive pressure within the housing to pull air into the inlet and push the air through the expansion chamber of the manifold housing and the carbon-dioxide absorbing apparatus and out of the housing.

17. The portable device of claim 15, further comprising:
   a control system disposed within the housing and operatively engaged to a power supply and the blower, wherein the control system operates the blower to generate a desired airflow rate.

18. The portable device of claim 17, further comprising:
   a sensor in operative communication with the control system that monitors an environmental concentration of $CO_2$ proximal to the sensor, wherein the control system receives data from the sensor to automatically operate the blower in such a manner to maintain environmental $CO_2$ concentration below a predetermined threshold.

* * * * *